US011813785B2

(12) United States Patent
Kobayashi et al.

(10) Patent No.: US 11,813,785 B2
(45) Date of Patent: Nov. 14, 2023

(54) EXTRUDER SCREW HAVING PATHS WITHIN THE SCREW, EXTRUDER, AND EXTRUSION METHOD

(71) Applicant: Shibaura Machine Co., Ltd., Tokyo (JP)

(72) Inventors: Akiyoshi Kobayashi, Fuji (JP); Shigeyuki Fujii, Numazu (JP); Takafumi Sameshima, Mishima (JP)

(73) Assignee: Shibaura Machine Co., Ltd., Tokyo (JP)

( * ) Notice: Subject to any disclaimer, the term of this patent is extended or adjusted under 35 U.S.C. 154(b) by 113 days.

(21) Appl. No.: 17/386,635

(22) Filed: Jul. 28, 2021

(65) Prior Publication Data
US 2021/0354362 A1    Nov. 18, 2021

Related U.S. Application Data

(60) Division of application No. 15/345,758, filed on Nov. 8, 2016, now Pat. No. 11,110,638, which is a (Continued)

(30) Foreign Application Priority Data

May 8, 2014    (JP) .................................. 2014-096892
Apr. 20, 2015    (JP) .................................. 2015-085953

(51) Int. Cl.
*B29C 48/51* (2019.01)
*B29C 48/57* (2019.01)
(Continued)

(52) U.S. Cl.
CPC .............. *B29C 48/51* (2019.02); *B29B 7/483* (2013.01); *B29B 7/488* (2013.01); *B29B 7/489* (2013.01);
(Continued)

(58) Field of Classification Search
CPC .......... B29B 7/489; B29B 7/847; B29B 7/82; B29B 7/90; B29B 7/845; B29B 7/42;
(Continued)

(56) References Cited

U.S. PATENT DOCUMENTS 2,783,498 A * 3/1957 Bruc .................... B30B 11/243
                                                      198/677
3,143,767 A * 8/1964 Wirth .................... B29C 48/345
                                                      366/85
(Continued)

FOREIGN PATENT DOCUMENTS

| CN | 87102748  | 11/1987 |
| CN | 1382573   | 12/2002 |

(Continued)

OTHER PUBLICATIONS

U.S. Appl. No. 17/168,781.
(Continued)

*Primary Examiner* — Charles Cooley
(74) *Attorney, Agent, or Firm* — DLA PIPER LLP US

(57) ABSTRACT

A conveyance portion, a barrier portion, and a path are provided at places of a portion of a screw main body in which a kneading portion is provided. In at least one of the places, an entrance is opened to cause raw materials, conveyance of which is limited by a barrier portion to increase pressure on the raw materials, to flow in. The raw materials flowing in from the entrance flow through the path in the opposite direction to a conveyance direction of the conveyance portion. An exit is opened in an outer circumferential surface of the screw main body at a position outside the conveyance portion in which the entrance is opened.

6 Claims, 13 Drawing Sheets

Related U.S. Application Data continuation of application No. PCT/JP2015/062566, filed on Apr. 24, 2015.

(51) Int. Cl.
| | | |
|---|---|---|
| *B29C 48/67* | (2019.01) | |
| *B29C 48/285* | (2019.01) | |
| *B29C 48/68* | (2019.01) | |
| *B29C 48/25* | (2019.01) | |
| *B29B 7/48* | (2006.01) | |
| B29C 48/395 | (2019.01) | |
| B29C 48/80 | (2019.01) | |
| B29B 7/82 | (2006.01) | |
| B29C 48/40 | (2019.01) | |
| B29C 48/63 | (2019.01) | |
| B29C 48/03 | (2019.01) | |
| B29C 48/55 | (2019.01) | |
| B29C 48/53 | (2019.01) | |
| B29C 48/54 | (2019.01) | |
| B29K 101/12 | (2006.01) | |
| B29K 105/00 | (2006.01) | |

(52) U.S. Cl.
CPC ........ *B29C 48/2511* (2019.02); *B29C 48/288* (2019.02); *B29C 48/57* (2019.02); *B29C 48/67* (2019.02); *B29C 48/681* (2019.02); B29B 7/823 (2013.01); B29B 7/826 (2013.01); B29C 48/03 (2019.02); B29C 48/397 (2019.02); B29C 48/402 (2019.02); B29C 48/53 (2019.02); B29C 48/54 (2019.02); B29C 48/55 (2019.02); B29C 48/63 (2019.02); B29C 48/832 (2019.02); B29C 48/834 (2019.02); B29K 2101/12 (2013.01); B29K 2105/25 (2013.01)

(58) Field of Classification Search
CPC ....... B29B 7/421; B29B 7/823; B29B 7/7485; B29B 7/7461; B29B 7/429; B29B 7/482; B29B 7/422; B29B 7/726; B29B 7/483; B29B 7/488; B29B 7/826; B29B 7/38; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29C 48/51; B29C 48/515; B29C 48/2511; B29C 48/288; B29C 48/57; B29C 48/67; B29C 48/681; B29C 48/03; B29C 48/397; B29C 48/53; B29C 48/63; B29C 48/832; B29C 48/834; B29C 48/255; B29K 2105/251; B29K 2023/12; B29K 2509/00; B29K 2101/12; B29K 2105/25
USPC ............... 425/200–209; 366/79–91
See application file for complete search history.

(56) References Cited

U.S. PATENT DOCUMENTS

| | | | | |
|---|---|---|---|---|
| 3,305,894 A * | 2/1967 | Pfaff | ............. | B29C 48/268 366/85 |
| 3,371,379 A * | 3/1968 | Reifenhauser | ............. | B29B 7/86 366/75 |
| 3,503,944 A * | 3/1970 | Heinrich | ............. | B29C 48/022 422/135 |
| 3,638,455 A * | 2/1972 | Francois | ............. | F16D 3/06 464/181 |
| 3,653,637 A * | 4/1972 | Eckhardt | ............. | B29C 45/464 366/89 |
| 3,712,594 A * | 1/1973 | Schippers | ............. | B29C 48/766 366/89 |
| 3,746,318 A * | 7/1973 | Schippers | ............. | B29B 7/42 366/79 |
| 3,795,386 A * | 3/1974 | Carter | ............. | F16J 15/406 100/145 |
| 3,797,550 A * | 3/1974 | Latinen | ............. | B01D 1/226 366/323 |
| 3,799,234 A * | 3/1974 | Skidmore | ............. | B29C 48/535 528/502 F |
| 3,884,452 A * | 5/1975 | Britten | ............. | B29C 48/695 366/85 |
| 3,917,507 A * | 11/1975 | Skidmore | ............. | B29C 48/762 264/102 |
| 3,924,842 A * | 12/1975 | Klein | ............. | B29C 48/51 366/318 |
| 3,963,558 A * | 6/1976 | Skidmore | ............. | B29C 48/76 264/102 |
| 3,985,348 A * | 10/1976 | Skidmore | ............. | B29C 48/29 366/76.9 |
| 3,993,292 A * | 11/1976 | Skidmore | ............. | B29C 48/29 366/87 |
| 3,999,921 A * | 12/1976 | Thor | ............. | B29B 7/42 366/76.9 |
| 4,082,488 A * | 4/1978 | Brinkschroder | ............. | B29C 48/402 366/85 |
| 4,100,244 A * | 7/1978 | Nonaka | ............. | B29C 48/767 264/28 |
| 4,118,163 A * | 10/1978 | Lee | ............. | B29B 7/726 425/208 |
| 4,162,854 A * | 7/1979 | Ullrich | ............. | B29C 48/402 366/83 |
| 4,169,679 A * | 10/1979 | Miller | ............. | B29C 48/05 366/76.1 |
| 4,279,275 A * | 7/1981 | Stanwood | ............. | F16D 1/06 464/181 |
| 4,290,702 A * | 9/1981 | Klein | ............. | B29C 45/5092 366/77 |
| 4,302,409 A * | 11/1981 | Miller | ............. | B29C 48/304 264/45.9 |
| 4,329,313 A * | 5/1982 | Miller | ............. | B29C 48/535 366/89 |
| 4,387,997 A * | 6/1983 | Klein | ............. | B29B 7/429 425/208 |
| 4,423,960 A * | 1/1984 | Anders | ............. | B29C 48/40 366/85 |
| 4,472,059 A * | 9/1984 | Klein | ............. | B29C 48/395 366/293 |
| 4,474,473 A * | 10/1984 | Higuchi | ............. | B29C 48/767 366/85 |
| 4,534,652 A * | 8/1985 | Stade | ............. | B29B 7/488 366/85 |
| 4,600,311 A * | 7/1986 | Mourrier | ............. | B29C 48/2564 366/322 |
| 4,637,790 A * | 1/1987 | Klein | ............. | B29C 48/395 425/208 |
| 4,645,445 A * | 2/1987 | Takanashi | ............. | B29C 48/2556 366/89 |
| 4,744,669 A * | 5/1988 | Kowalczyk | ............. | B29B 7/485 366/85 |
| 4,752,135 A * | 6/1988 | Loomans | ............. | B29B 7/845 366/85 |
| 4,802,140 A * | 1/1989 | Dowling | ............. | B29B 7/42 366/144 |
| 4,807,351 A * | 2/1989 | Berg | ............. | B21D 26/14 403/283 |
| 4,826,323 A * | 5/1989 | Loomans | ............. | B29B 7/826 366/85 |
| 4,875,796 A * | 10/1989 | Storm | ............. | F16D 1/104 403/345 |
| 4,875,847 A * | 10/1989 | Wenger | ............. | B30B 11/243 366/85 |

(56) References Cited

U.S. PATENT DOCUMENTS

| | | | | |
|---|---|---|---|---|
| 4,902,455 | A * | 2/1990 | Wobbe | B29B 7/726 |
| | | | | 264/102 |
| 4,959,186 | A * | 9/1990 | Dollhopf | B29C 48/745 |
| | | | | 425/173 |
| 4,983,114 | A * | 1/1991 | Hauck | B29C 48/40 |
| | | | | 366/85 |
| 5,102,594 | A * | 4/1992 | Burlet | B29C 48/766 |
| | | | | 159/2.3 |
| 5,130,070 | A * | 7/1992 | Martin | B29C 48/76 |
| | | | | 264/102 |
| 5,304,012 | A * | 4/1994 | Wendling | B21K 25/00 |
| | | | | 403/359.6 |
| 5,358,681 | A * | 10/1994 | Jerman | B29C 48/41 |
| | | | | 159/2.3 |
| 5,499,870 | A * | 3/1996 | Rockstedt | B29C 48/402 |
| | | | | 366/85 |
| 5,547,277 | A * | 8/1996 | Caspelherr | B29C 48/84 |
| | | | | 366/147 |
| 5,662,415 | A * | 9/1997 | Gisko | B29B 7/845 |
| | | | | 366/139 |
| 5,797,677 | A | 8/1998 | Weihrich et al. | |
| 5,804,111 | A * | 9/1998 | Kobayashi | B29C 48/57 |
| | | | | 425/149 |
| 5,843,489 | A * | 12/1998 | Nakano | B29B 7/488 |
| | | | | 366/147 |
| 6,024,479 | A * | 2/2000 | Haring | B29C 48/405 |
| | | | | 366/85 |
| 6,042,260 | A * | 3/2000 | Heidemeyer | B29C 48/405 |
| | | | | 366/100 |
| 6,220,745 | B1 * | 4/2001 | Kobayashi | B29B 7/488 |
| | | | | 366/291 |
| 6,958,128 | B2 * | 10/2005 | Gates | B29B 7/421 |
| | | | | 366/85 |
| 6,997,596 | B1 * | 2/2006 | Eigruber | B29C 48/2564 |
| | | | | 366/81 |
| 8,048,948 | B2 * | 11/2011 | Shimizu | B29B 7/90 |
| | | | | 524/502 |
| 8,975,336 | B2 * | 3/2015 | Shimizu | B29C 48/832 |
| | | | | 525/461 |
| 9,199,393 | B2 * | 12/2015 | Shimizu | B29B 7/28 |
| 10,967,554 | B2 * | 4/2021 | Kobayashi | B29B 7/489 |
| 11,072,104 | B2 * | 7/2021 | Kobayashi | B29B 7/426 |
| 11,110,638 | B2 * | 9/2021 | Kobayashi | B29C 48/51 |
| 11,220,022 | B2 * | 1/2022 | Kobayashi | B29C 48/535 |
| 11,224,991 | B2 * | 1/2022 | Kobayashi | B29B 7/7485 |
| 11,229,889 | B2 * | 1/2022 | Kobayashi | B29B 7/42 |
| 11,230,033 | B2 * | 1/2022 | Kobayashi | B01F 27/1143 |
| 11,400,632 | B2 * | 8/2022 | Kobayashi | B29C 48/67 |
| 11,400,633 | B2 * | 8/2022 | Kobayashi | B29C 48/397 |
| 11,565,440 | B2 * | 1/2023 | Kobayashi | B29B 7/84 |
| 11,584,830 | B2 * | 2/2023 | Sameshima | C08J 3/203 |
| 2002/0186612 | A1 * | 12/2002 | Murakami | B29C 48/92 |
| | | | | 366/147 |
| 2003/0206482 | A1 * | 11/2003 | Griggs | B29C 48/402 |
| | | | | 366/85 |
| 2004/0222543 | A1 * | 11/2004 | Innerebner | B29B 7/603 |
| | | | | 264/102 |
| 2004/0238990 | A1 * | 12/2004 | Hermann | B29C 48/385 |
| | | | | 264/102 |
| 2005/0087904 | A1 * | 4/2005 | Bryan | B27N 3/28 |
| | | | | 264/211 |
| 2005/0111294 | A1 * | 5/2005 | Gates | B29B 7/429 |
| | | | | 366/85 |
| 2006/0108706 | A1 * | 5/2006 | Galimberti | B29C 48/37 |
| | | | | 425/204 |
| 2008/0267003 | A1 * | 10/2008 | Kasliwal | B29C 48/022 |
| | | | | 366/85 |
| 2009/0175118 | A1 * | 7/2009 | Kasliwal | B29B 7/603 |
| | | | | 366/85 |
| 2013/0163373 | A1 * | 6/2013 | Yamaguchi | B29C 48/67 |
| | | | | 366/300 |
| 2014/0027095 | A1 * | 1/2014 | Warchol | B29C 48/845 |
| | | | | 165/87 |
| 2016/0207225 | A1 * | 7/2016 | Kobayashi | B29C 48/57 |
| 2016/0303766 | A1 * | 10/2016 | Kobayashi | B29B 7/42 |
| 2016/0332331 | A1 * | 11/2016 | Kobayashi | B29C 48/54 |
| 2016/0332332 | A1 * | 11/2016 | Kobayashi | B29B 7/42 |
| 2017/0021547 | A1 * | 1/2017 | Kobayashi | B29C 48/298 |
| 2017/0050366 | A1 * | 2/2017 | Kobayashi | B29B 7/845 |
| 2017/0050367 | A1 * | 2/2017 | Kobayashi | B29C 48/57 |
| 2017/0113394 | A1 * | 4/2017 | Kobayashi | B29B 7/484 |
| 2017/0225360 | A1 * | 8/2017 | Kobayashi | B29B 7/489 |
| 2017/0225379 | A1 * | 8/2017 | Kobayashi | B29B 7/489 |
| 2018/0093233 | A1 * | 4/2018 | Kobayashi | B29C 48/507 |
| 2018/0093234 | A1 * | 4/2018 | Kobayashi | B29B 7/483 |
| 2019/0352472 | A1 * | 11/2019 | Sameshima | C08F 236/10 |
| 2020/0282622 | A1 * | 9/2020 | Ougier | B29C 48/85 |
| 2021/0154906 | A1 * | 5/2021 | Kobayashi | B29C 48/67 |
| 2021/0316492 | A1 * | 10/2021 | Kobayashi | B29B 7/483 |
| 2021/0354362 | A1 * | 11/2021 | Kobayashi | B29B 7/483 |
| 2021/0362374 | A1 * | 11/2021 | Sameshima | C08J 3/005 |
| 2022/0305704 | A1 * | 9/2022 | Sameshima | C08L 101/00 |
| 2022/0325455 | A1 * | 10/2022 | Sasai | B29C 48/298 |
| 2023/0091065 | A1 * | 3/2023 | Chastek | B29C 48/252 |
| | | | | 264/211.21 |

FOREIGN PATENT DOCUMENTS

| | | | | |
|---|---|---|---|---|
| CN | 101973121 | | 2/2011 | |
| CN | 103068540 | | 4/2013 | |
| DE | 2040919 | A | 2/1972 | |
| DE | 2454785 | A | 5/1976 | |
| DE | 25 48 490 | | 5/1977 | |
| DE | 3026842 | A * | 2/1982 | |
| DE | 3744193 | C * | 1/1989 | |
| DE | 69417466 | | 12/1999 | |
| DE | 102011014474 | A1 * | 9/2012 | B23P 15/00 |
| EP | 0 688 600 | | 12/1995 | |
| EP | 2 578 378 | | 4/2013 | |
| EP | 3650196 | | 5/2020 | |
| EP | 3650196 | A1 * | 5/2020 | |
| EP | 2822748 | B1 * | 8/2020 | B29C 44/3446 |
| GB | 1175127 | | 12/1969 | |
| GB | 1 501 412 | | 2/1978 | |
| JP | 48-61153 | | 8/1973 | |
| JP | S50-143863 | | 11/1975 | |
| JP | S52-72573 | | 5/1977 | |
| JP | 56-037054 | | 8/1981 | |
| JP | S57-034936 | | 2/1982 | |
| JP | S57-41932 | | 3/1982 | |
| JP | 57-107826 | | 7/1982 | |
| JP | S57-163547 | | 10/1982 | |
| JP | S58-025943 | | 2/1983 | |
| JP | 59-184635 | | 10/1984 | |
| JP | H01-320129 | | 12/1989 | |
| JP | 02120006 | A * | 5/1990 | |
| JP | 5-220818 | | 8/1993 | |
| JP | H06-170920 | | 6/1994 | |
| JP | 07-088923 | | 4/1995 | |
| JP | 07-227836 | | 8/1995 | |
| JP | 07329150 | A * | 12/1995 | |
| JP | H09-504755 | | 5/1997 | |
| JP | 2002-321214 | | 11/2002 | |
| JP | 2004-529018 | | 9/2004 | |
| JP | 2005035286 | A * | 2/2005 | |
| JP | 2005-169764 | | 6/2005 | |
| JP | 2008-302555 | | 12/2008 | |
| JP | 2009-045804 | | 3/2009 | |
| JP | 2010-069771 | | 4/2010 | |
| JP | 2010-105285 | | 5/2010 | |
| JP | 2010-137405 | | 6/2010 | |
| JP | 2011-020341 | | 2/2011 | |
| JP | 2011-046104 | | 3/2011 | |
| JP | 2011-083976 | | 4/2011 | |
| JP | 2011-116025 | | 6/2011 | |
| JP | 2012-051289 | | 3/2012 | |
| JP | 2013-071428 | | 4/2013 | |
| JP | 2013-123841 | | 6/2013 | |
| JP | 53-69614 | | 12/2013 | |
| JP | 2014-019045 | | 2/2014 | |

(56) References Cited

FOREIGN PATENT DOCUMENTS

| | | | |
|---|---|---|---|
| KR | 2002-0082788 | | 10/2002 |
| KR | 10-0401578 | | 8/2004 |
| KR | 10-2010-0087738 | | 8/2010 |
| SU | 889462 | | 12/1981 |
| SU | 889462 | A2 * | 12/1981 |
| WO | WO 2020-025446 | | 2/1920 |
| WO | WO-2005028184 | A1 * | 3/2005 |
| WO | WO-2007033328 | A2 * | 3/2007 |
| WO | WO 2010/061872 | | 6/2010 |
| WO | WO 2012/029271 | | 3/2012 |
| WO | WO 2013-133453 | | 9/2013 |
| WO | WO 2015/163197 | | 10/2015 |
| WO | WO-2015156230 | A1 * | 10/2015 |
| WO | WO-2015163119 | A1 * | 10/2015 |
| WO | WO-2015163197 | A1 * | 10/2015 |
| WO | WO 2015/170617 | | 11/2015 |
| WO | WO-2015170568 | A1 * | 11/2015 |
| WO | WO-2015170616 | A1 * | 11/2015 |
| WO | WO-2015170617 | A1 * | 11/2015 |
| WO | WO-2016068048 | A1 * | 5/2016 |
| WO | WO-2016068049 | A1 * | 5/2016 |
| WO | WO-2016175081 | A1 * | 11/2016 |
| WO | WO-2016175082 | A1 * | 11/2016 |
| WO | WO-2019198479 | A1 * | 10/2019 |
| WO | WO-2021191718 | A1 * | 9/2021 |

OTHER PUBLICATIONS

U.S. Appl. No. 15/345,711.
International Search Report (with English Translation) issued in PCT/JP2015/061874 dated Jul. 7, 2015.
Written Opinion (with English Translation) issued in PCT/JP2015/061874 dated Jul. 7, 2015.
International Preliminary Report on Patentability issued in PCT/JP2015/061874 dated Nov. 8, 2016.
International Search Report (with English Translation) issued in PCT/JP2015/062549 dated Jul. 21, 2015.
Written Opinion (with English Translation) issued in PCT/JP2015/062549 dated Jul. 21, 2015.
International Preliminary Report on Patentability issued in PCT/JP2015/062549 dated Nov. 8, 2016.
International Search Report (with English Translation) issued in PCT/JP2015/062566 dated Jul. 21, 2015.
International Preliminary Report on Patentability issued in PCT/JP2015/062566 dated Nov. 8, 2016.
English Language Translation and Abstract of WO 2012/029271 Mar. 8, 2012.
English Language Translation and Abstract of JP 2010-105285 May 13, 2010.
English Language Translation and Abstract of JP S50-143863 published Nov. 19, 1975.
English Language Translation and Abstract of JP 2009-45804 published Mar. 5, 2009.
English Language Translation and Abstract of JP 2002-321214 published Nov. 5, 2002.
English Language Abstract of JP H09-504755 published May 13, 1997.
English Language Translation and Abstract of JP 48-61153 published Aug. 3, 1973.
English Language Translation and Abstract of JP H06-170920 Jun. 21, 1994.
English Language Translation and Abstract of JP 2011-116025 published Jun. 16, 2011.
English Language Translation and Abstract of JP 2004-529018 published Sep. 24, 2004.
English Language Translation and Abstract of JP H01-320129 published Dec. 26, 1989.
U.S. Appl. No. 15/345,750.
Taiwanese Office Action (with English Translation) issued in TW 104114405 dated Jun. 16, 2016.
Taiwanese Office Action (with English Translation) issued in TW 104114406 dated Jun. 16, 2016.
English Language Abstract of JP S57-034936 published Feb. 25, 1982.
English Language Abstract of JP 2008-302555 published Dec. 18, 2008.
English Language Abstract of JP 2011-083976 published Apr. 28, 2011.
English Language Abstract of JP 07-227836 published Aug. 29, 1995.
English Language Abstract of JP 2010-137405 published Jun. 24, 2010.
English Language Abstract of JP 2013-123841 published Jun. 24, 2013.
English Language Abstract of JP 2011-020341 published Feb. 3, 2011.
Korean Office Action issued in KR 10-2016-7019779 dated Nov. 27, 2017.
English Language Abstract of KR 2002-0082788 published Oct. 31, 2002.
Chinese Office Action issued in CN 2015-80023951.3 dated Mar. 30, 2018.
Chinese Office Action issued in CN 2015-80024101.5 dated Apr. 2, 2018.
Xiaozheng, Geng "Plastics Mixing & Continuous Mixing Equipment", China Light Industry Press, pp. 349-353, Jan. 31, 2008.
Chinese Office Action (with English Translation) issued in CN 201580005725.2 dated Apr. 24, 2017.
English Language Translation and Abstract of CN 1382573 published Dec. 4, 2002.
English Language Translation and Abstract of JP 57-163547 published Oct. 7, 1982.
Korean Office Action issued in KR 2016-7033989 dated Jul. 16, 2018.
Korean Office Action issued in KR 2016-7033993 dated Aug. 2, 2018.
German Office Action issued in DE Application No. 11 2015 002 161.2 dated Aug. 8, 2019.
International Search Report issued in International Application No. PCT/JP2015/060641 dated May 26, 2015.
International Search Report issued in International Application No. PCT/JP2015/061487 dated Jul. 7, 2015.
International Search Report issued in International Application No. PCT/JP2016/062278 dated Jul. 12, 2016.
International Search Report issued in International Application No. PCT/JP2016/062279 dated Jul. 12, 2016.
Written Opinion issued in International Application No. PCT/JP2015/060641 dated May 26, 2015.
Written Opinion issued in International Application No. PCT/JP2015/061487 dated Jul. 7, 2015.
Written Opinion issued in International Application No. PCT/JP2016/062278 dated Jul. 12, 2016.
Written Opinion issued in International Application No. PCT/JP2016/062279 dated Jul. 12, 2016.
Taiwan Office Action issued in Taiwan Application No. 104112230 dated Sep. 2, 2016.
Taiwan Office Action issued in Taiwan Application No. 104112709 dated Sep. 2, 2016.
Chinese Office Action issued in Chinese Application No. 201580007088.2 dated Mar. 3, 2017.
Chinese Office Action issued in Chinese Application No. 201580007825.9 dated Mar. 24, 2017.
Korean Office Action issued in KR 10-2016-7021148 dated Nov. 29, 2017.
English Language Abstract of JP 7-227836 published Aug. 29, 1995.
English Language Abstract of JP 2005-169764 published Jun. 30, 2005.
English Language Abstract of JP 57-041932 published Mar. 9, 1982.
English Language Abstract of KR 10-2010-0087738 published Aug. 5, 2010.
Office Action in CN Application No. 201680024052X dated Jul. 22, 2019.

(56) References Cited

OTHER PUBLICATIONS

Office Action in DE Application No. 112015001938.3 dated Jul. 26, 2019.
Japanese Office Action in JP Application No. 2015-082775 dated May 7, 2019.
German Office Action in DE Application No. 11 2015 002 164.7, dated Jun. 23, 2020.
U.S. Appl. No. 15/221,277.
U.S. Appl. No. 15/221,293.
U.S. Appl. No. 15/795,534.
U.S. Appl. No. 15/795,535.
U.S. Appl. No. 15/345,758.
U.S. Appl. No. 17/166,781.

* cited by examiner

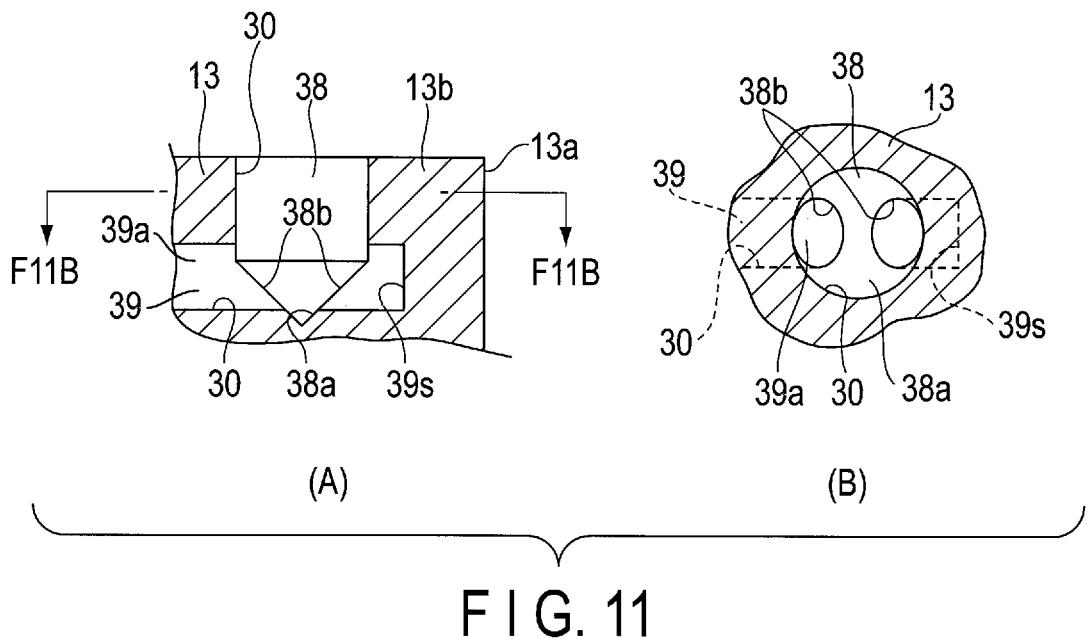
F I G. 11
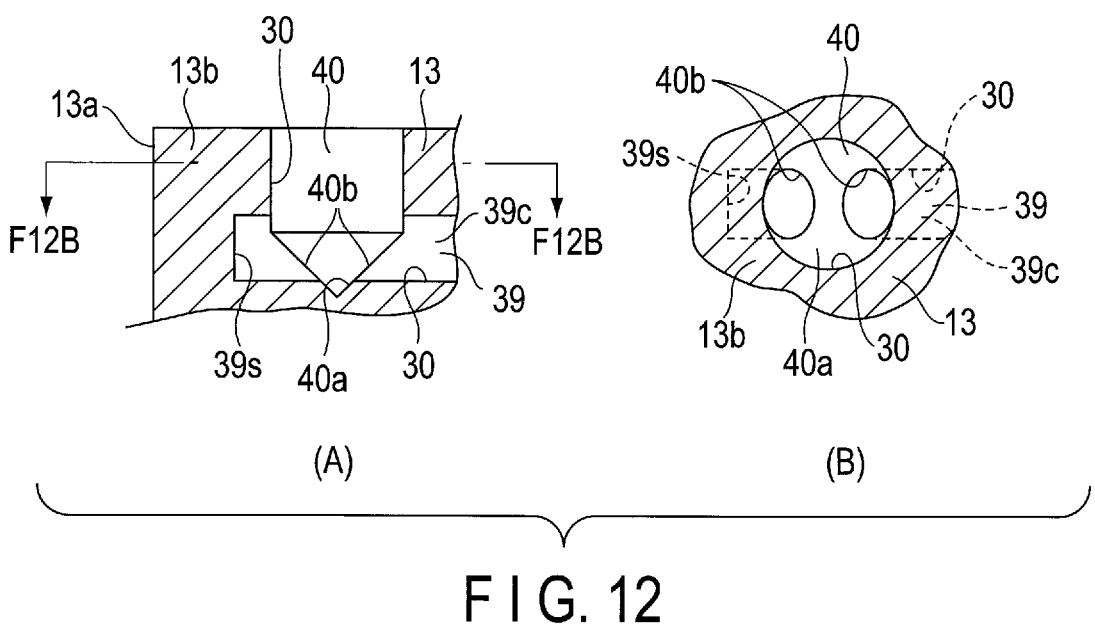
F I G. 12

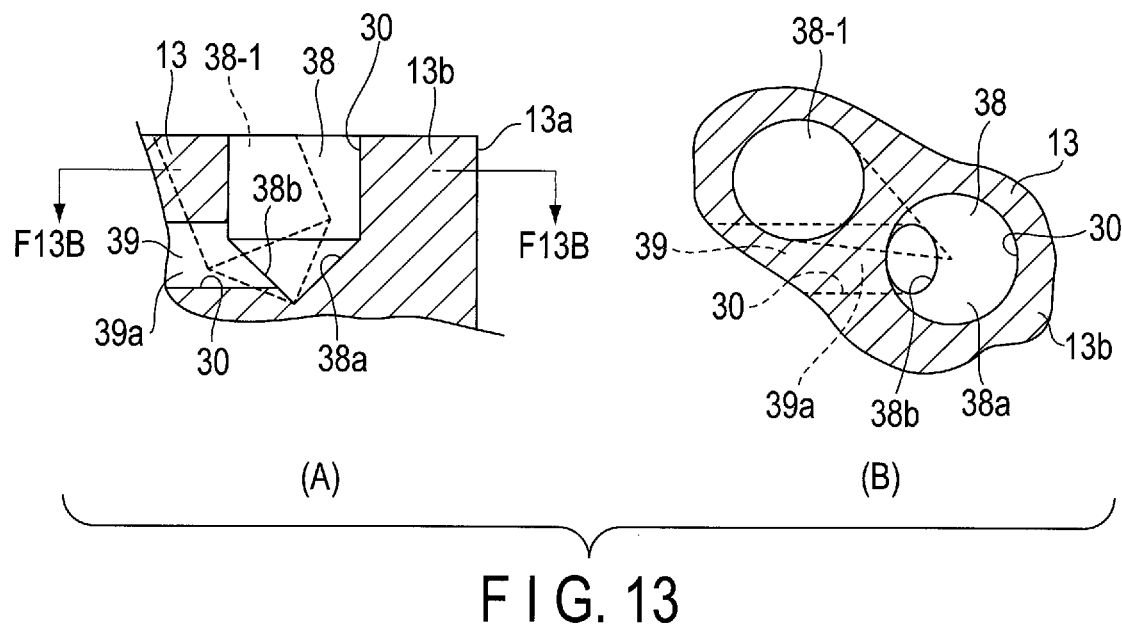
F I G. 13
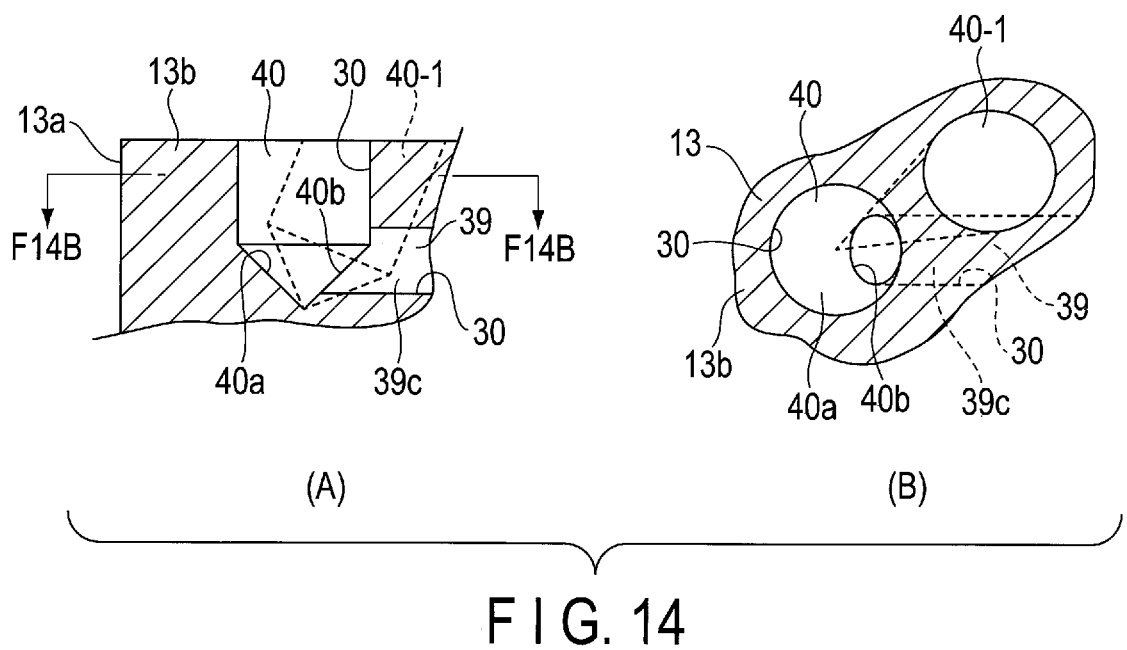
F I G. 14

EXTRUDER SCREW HAVING PATHS WITHIN THE SCREW, EXTRUDER, AND EXTRUSION METHOD

CROSS REFERENCE TO RELATED APPLICATIONS

This application is a Divisional Application of U.S. patent application Ser. No. 15/345,758 filed Nov. 8, 2016, which is a Continuation Application of PCT Application No. PCT/JP2015/062566, filed Apr. 24, 2015 and based upon and claiming the benefit of priority from prior Japanese Patent Applications No. 2014-096892, filed May 8, 2014; and No. 2015-085953, filed Apr. 20, 2015, the entire contents of all of which are incorporated herein by reference.

BACKGROUND OF THE INVENTION

1. Field of the Invention

The present invention relates to an extrusion technique capable of improving the degree of kneading without elongating an extruder (screw).

2. Description of the Related Art

Conventionally, an extrusion technique of improving the degree of kneading, using "extension action", which is imparted to raw materials when the raw materials pass from a wide place to a narrow place, has been known. For example, Patent Literature 1 and Patent Literature 2 disclose an extrusion technique of additionally providing an extension impartation mechanism which imparts extension action to raw materials at the tip of an extruder (screw). Moreover, Patent Literature 3 discloses an extrusion technique of securing an extension impartation region which increases a flow of a high degree of extension between a pair of screws provided with spiral flights.

CITATION LIST

Patent Literature

Patent Literature 1
JP H07-227836
Patent Literature 2
JP 2010-137405
Patent Literature 3
JP 2013-123841

BRIEF SUMMARY OF THE INVENTION

Technical Problem

However, in the extrusion technique disclosed in Patent Literature 1 and Patent Literature 2, an extruder as a whole is elongated by the amount by which the extension impartation mechanism is additionally provided. In particular, Patent Literature 2, paragraph [0027], discloses that extension action is imparted to raw materials by making the raw materials pass through a gap between surfaces facing each other in parallel more than once. Thus, to realize the disclosure, further elongation of the extruder as a whole is inevitable.

In addition, in the extrusion technique of Patent Literature 3, raw materials conveyed by the pair of screws include those flowing along the spiral flights while keeping away from the extension impartation region, as well as those passing through the extension impartation region. Accordingly, in the extrusion technique of Patent Literature 3, it is unclear whether all the raw materials conveyed by the pair of screws thoroughly pass through the extension impartation region. In this case, to thoroughly make all the raw materials pass through the extension impartation region, the extension impartation region needs to be secured sufficiently long. However, this causes the extruder (screw) to elongate by the amount by which the extension impartation region is made longer.

Therefore, an object of the present invention is to provide an extrusion technique of making a screw have the function of imparting extension action to raw materials, thereby thoroughly imparting extension action to all the raw materials conveyed by the screw and improving the degree of kneading without elongating an extruder (screw).

Solution to Problem

In general, according to one embodiment, a conveyance portion, a barrier portion, and a path are provided at places of a portion of a screw main body in which a kneading portion is provided. In at least one of the places, an entrance is opened to cause raw materials, conveyance of which is limited by a barrier portion to increase pressure on the raw materials, to flow in. The raw materials flowing in from the entrance flow through the path in the opposite direction to a conveyance direction of the conveyance portion. An exit is opened in an outer circumferential surface of the screw main body at a position outside the conveyance portion in which the entrance is opened.

Advantageous Effects of Invention

According to the present invention, an extrusion technique of making a screw have the function of imparting extension action to raw materials, thereby thoroughly imparting extension action to all the raw materials conveyed by the screw and improving the degree of kneading without elongating an extruder (screw) can be achieved.

BRIEF DESCRIPTION OF THE SEVERAL VIEWS OF THE DRAWING

FIG. 11 (A) is an expanded sectional view showing the structure of the entrance portion of the path in a modification of the present invention, and FIG. 11 (B) is a sectional view along line F11B-F11B of FIG. 11 (A).

FIG. 12 (A) is an expanded sectional view showing the structure of the exit portion of the path in the modification of the present invention, and FIG. 12 (B) is a sectional view along line F12B-F12B of FIG. 12 (A).

FIG. 13 (A) is an expanded sectional view showing the structure of the entrance portion of the path in a modification of the present invention, and FIG. 13 (B) is a sectional view along line F13B-F13B of FIG. 13 (A).

FIG. 14 (A) is an expanded sectional view showing the structure of the exit portion of the path in the modification of the present invention, and FIG. 14 (B) is a sectional view along line F14B-F14B of FIG. 14 (A).

DETAILED DESCRIPTION OF THE INVENTION

One of the embodiments of the present invention will be described hereinafter with reference to the accompanying drawings.

Figure 1:
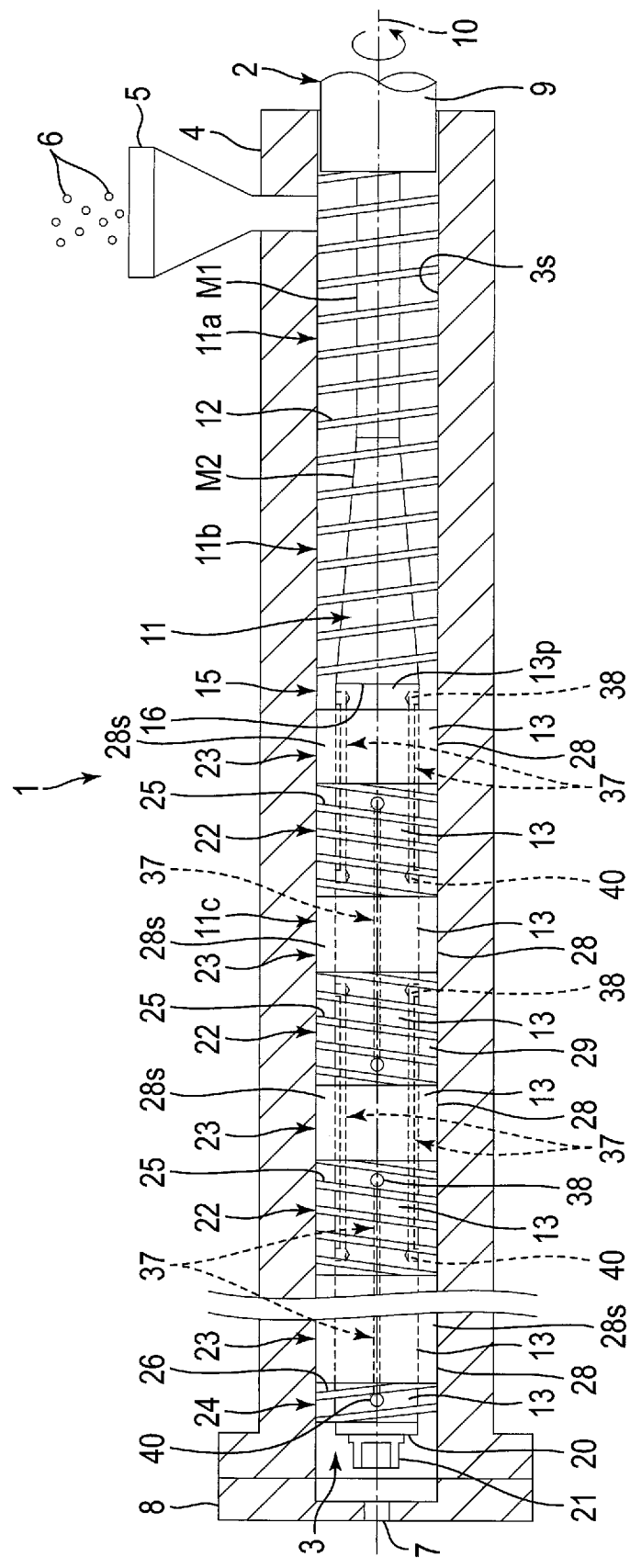
FIG. 1 is a transverse sectional view showing an external structure of an extruder screw in a whole structure of a single screw extruder according to one of the embodiments of the present invention.
Figure 2:
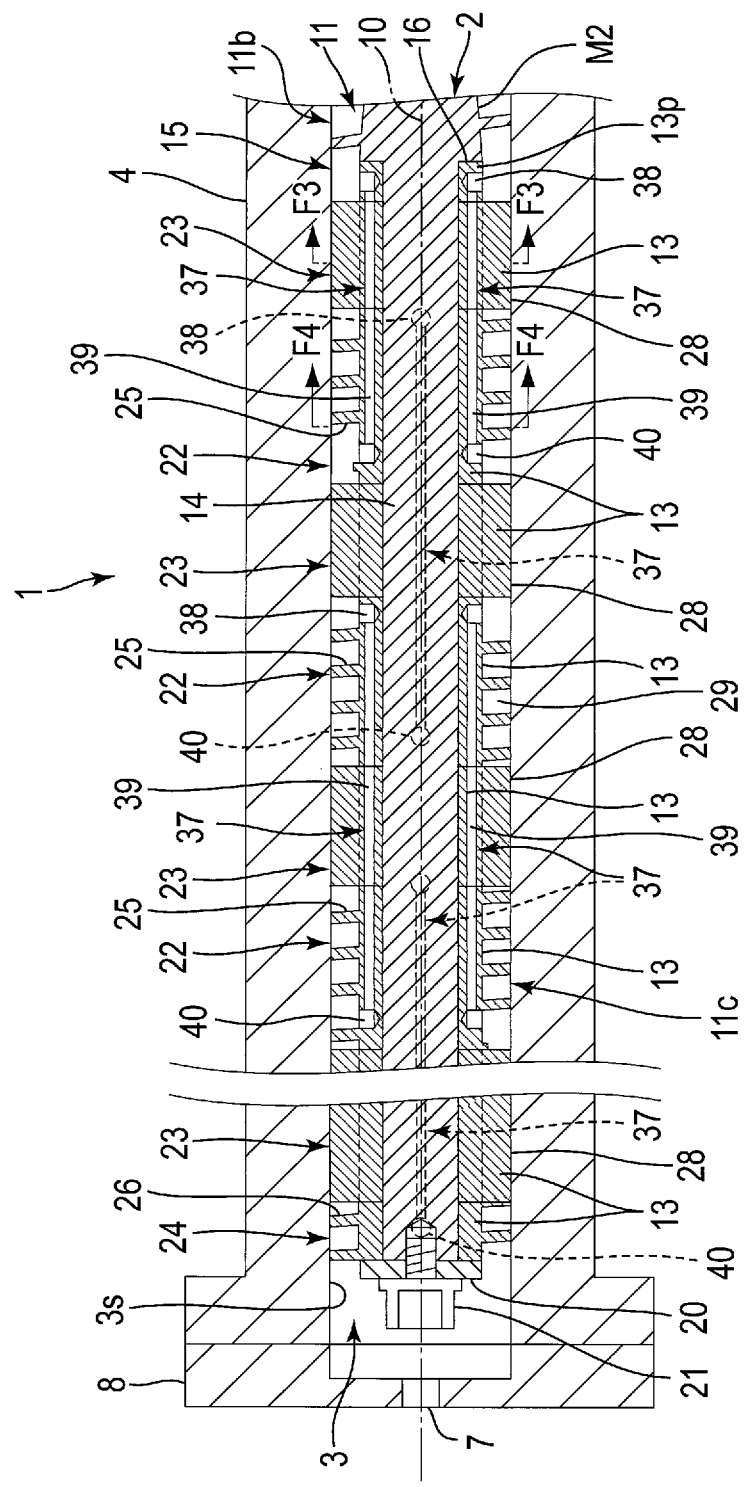
FIG. 2 is a transverse sectional view showing an internal structure of the extruder screw in a kneading portion of the single screw extruder according to the one of the embodiments of the present invention.

FIG. 1 and FIG. 2 show a structure of a single screw extruder 1 according to the present embodiment. The single screw extruder 1 comprises an extruder screw 2 and a barrel 4 comprising a cylinder 3 in which the screw 2 is rotatably inserted.

In one end of the barrel 4, a supply port 5 through which materials 6 such as thermoplastic resin are supplied is provided. The supply port 5 penetrates the barrel 4 and communicates with the cylinder 3. In addition, a discharge port 7 is provided in the other end of the barrel 4. The discharge port 7 is formed in a lid 8 joined to cover an opening in the other end of the barrel 4. From the discharge port 7, kneaded materials produced by the extruder screw 2 are continuously extruded.

Moreover, in the barrel 4, a cooling water path through which cooling water flows, a heater and a temperature sensor (both of which are not shown in the figures), etc., are provided. By controlling the heater and heating the barrel 4 to a set temperature, the inside of the cylinder 3 can be heated. If the barrel 4 exceeds the set temperature, the inside of the cylinder 3 can be cooled to the set temperature by making cooling water flow through the cooling water path to cool the barrel 4.

The extruder screw 2 extends straight from its basal end to its tip, and its total length is set to be a length corresponding to the total length of the cylinder 3 of the barrel 4. The extruder screw 2 can be thereby disposed to be rotatably inserted in the cylinder 3 of the barrel 4. In a state in which the extruder screw 2 is disposed to be rotatably inserted in the cylinder 3 of the barrel 4, the basal end of the extruder screw 2 is positioned on one end side of the barrel 4, on which the supply port 5 is provided, and the tip of the extruder screw 2 is positioned on the other end side of the barrel 4, on which the discharge port 7 is provided.

At the basal end of the extruder screw 2, a stopper portion 9 is coaxially provided. The stopper portion 9 is formed to close an opening of the cylinder 3 on the basal end side of the extruder screw 2 in a state in which the extruder screw 2 is rotatably inserted and disposed in the cylinder 3 of the barrel 4. The materials 6 supplied to the cylinder 3 can be thereby prevented from leaking to the outside. The stopper portion 9 can be coupled to a rotating device, for example, a motor, through a coupling not shown in the figures. When torque from the rotating device is transmitted to the stopper portion 9, the extruder screw 2 rotates on a straight axial line 10 extending from its basal end to its tip.

Moreover, the extruder screw 2 comprises a screw main body 11 rotating integrally with the extruder screw 2. In the following description, the rotation direction (left-handed rotation or right-handed rotation) of the screw main body 11 is a rotation direction (left-handed rotation or right-handed rotation) from the perspective of the basal end side of the screw main body 11, in other words, from the perspective of the supply port 5 of the barrel 4 in the direction of the discharge port 7. Similarly, the twist direction (clockwise or anticlockwise) of flights 12, 25, and 26 is a twist direction (clockwise or anticlockwise) of the flights 12, 25, and 26 from the perspective of the basal end side of the screw main body 11.

The screw main body 11 comprises a transfer portion 11a, a melt-and-mix portion 11b, and a kneading portion 11c in order from the basal end toward the tip of the screw main body 11. The transfer portion 11a continuously conveys the materials 6 supplied from the supply port 5 to the cylinder 3 toward the melt-and-mix portion 11b. The melt-and-mix portion 11b continuously melts and mixes the materials 6. Then, materials obtained by melting and mixing each of the materials 6 are continuously introduced to the kneading portion 11c as raw materials for kneading. In the kneading portion 11c, desired kneaded materials are continuously produced.

The portion of the screw main body 11 in which the kneading portion 11c is provided is formed by disposing especially portions which impart extension action to raw materials (extension action regions), not only portions which impart shearing action to raw materials (shearing action regions), at places in the axial direction. The degree to which the raw materials are dispersed is thereby improved. As a result, kneaded materials excellent in the degree of kneading can be produced. Then, kneaded materials produced in the cylinder 3 are continuously extruded through the discharge port 7.

The flight 12 spirally twisted is continuously formed on outer circumferential surfaces M1 and M2 of the screw main body 11 extending from the transfer portion 11a to the melt-and-mix portion 11b. The flight 12 is configured to continuously convey each of the materials 6 supplied from the supply port 5 to the cylinder 3 from the transfer portion 11a toward the melt-and-mix portion 11b. Thus, the flight 12 is twisted in the opposite direction to the rotation direction of the screw main body 11.

The figures show the flight 12 in the case where each of the materials 6 is conveyed by rotating the screw main body 11 left-handed. In this case, the twist direction of the flight 12 is set to be clockwise as in the case of a right-handed screw. If each of the materials 6 is conveyed by rotating the screw main body 11 right-handed, it suffices that the twist direction of the flight 12 is set to be anticlockwise as in the case of a left-handed screw.

The outer circumferential surface M1 of the screw main body 11 in the transfer portion 11a has a columnar shape, and a gap between the outer circumferential surface M1 and an inner surface 3s of the cylinder 3 is set wide. The outer circumferential surface M2 of the screw main body 11 in the melt-and-mix portion 11b has a shape widening from the transfer portion 11a toward the kneading portion 11c, and a gap between the outer circumferential surface M2 and the inner surface 3s of the cylinder 3 is set to continuously become narrower from the transfer portion 11a toward the kneading portion 11c.

Here, in a state in which the extruder screw 2 is rotated left-handed, each of the materials 6 supplied from the supply port 5 to the cylinder 3 is conveyed by the flight 12 from the transfer portion 11a to the melt-and-mix portion 11b. In the melt-and-mix portion 11b, each of the materials 6 is subjected to compression mainly from the gap that continuously becomes narrower while being heated by the heater. The materials 6 thereby form melted and mixed raw materials for kneading. The raw materials are continuously conveyed from the melt-and-mix portion 11b to the kneading portion 11c.

The portion of the screw main body 11 in which the kneading portion 11c is provided is composed of cylindrical tubes 13 and an axis of rotation 14 (see FIG. 2) supporting the tubes 13. Moreover, the kneading portion 11c comprises an introduction portion 15 for introducing raw materials conveyed from the melt-and-mix portion 11b. The introduction portion 15 is formed to be adjacent to an end face 16 of the melt-and-mix portion 11b. Details of the introduction portion 15 will be described later.

The axis of rotation 14 is provided in a region extending from the tip of the screw main body 11 to the end face 16 of the melt-and-mix portion 11b. The axis of rotation 14 extends straight from its basal end to its tip, and the basal end is coaxially connected to the end face 16 of the melt-and-mix portion 11b. The axis of rotation 14 has a columnar shape, and its contours are set to be smaller than those of the end face 16 of the melt-and-mix portion 11b.

It suffices that as a method of connecting the basal end of the axis of rotation 14 and the end face 16 of the melt-and-mix portion 11b, existing methods are selected as appropriate, for example, a method of coaxially forming the axis of rotation 14 integrally with the screw main body 11 extending from the transfer portion 11a to the melt-and-mix portion 11b, or a method of forming the screw main body 11 extending from the transfer portion 11a to the melt-and-mix portion 11b, and the axis of rotation 14 separately, and then coaxially coupling the basal end of the axis of rotation 14 to the end face 16 of the melt-and-mix portion 11b.

Figure 3:
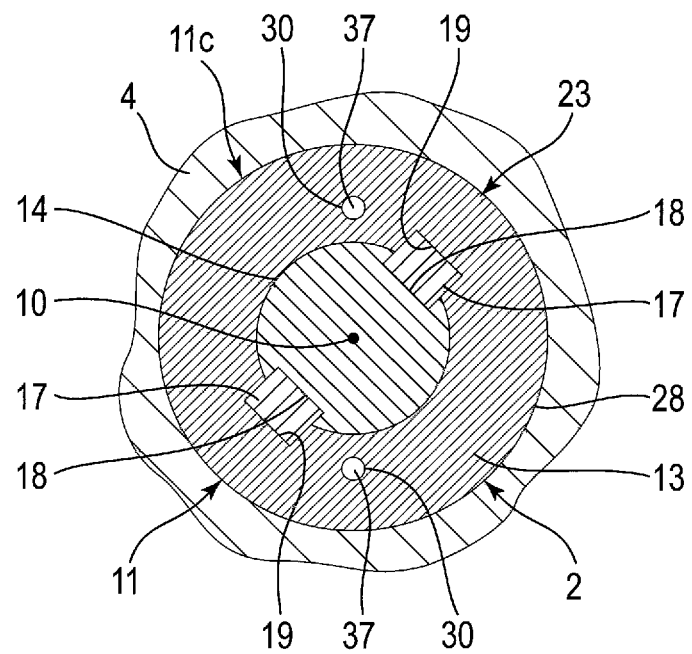
FIG. 3 is a sectional view along line F3-F3 of FIG. 2.
Figure 4:
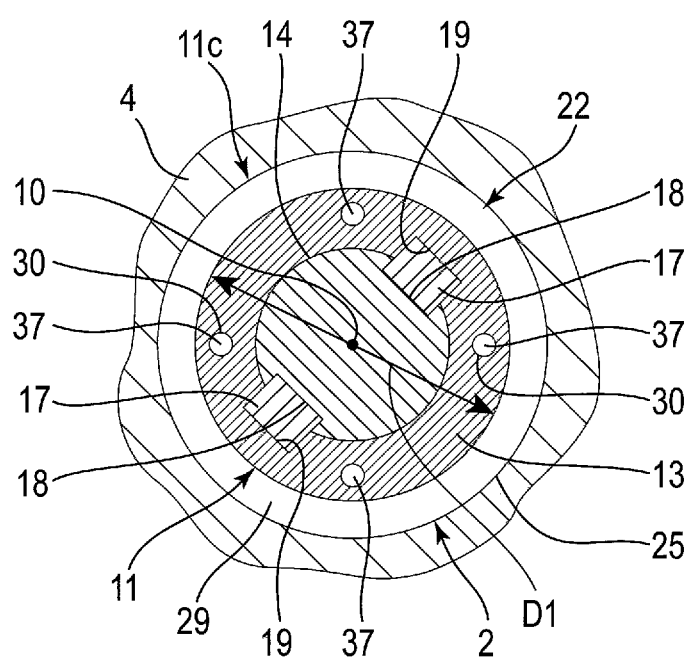
FIG. 4 is a sectional view along line F4-F4 of FIG. 2.

As shown in FIG. 3 and FIG. 4, a pair of keys 17 is provided on the outer circumferential surface of the axis of rotation 14 as an example of a supporting structure in which the tubes 13 are supported by the axis of rotation 14. The keys 17 are fitted in a pair of groove portions 18, respectively, which is formed at positions shifted 180° in the circumferential direction along the outer circumferential surface of the axis of rotation 14. Each of the groove portions 18 is formed by cutting out a part of the outer circumferential surface of the axis of rotation 14 in the axial direction.

Moreover, each of the tubes 13 is formed to allow the axis of rotation 14 to coaxially penetrate them along their inner circumferential surfaces. On the inner circumferential surfaces of the tubes 13, keyways 19 are formed at positions shifted 180° in the circumferential direction. The pair of keyways 19 is formed by cutting out a part of the inner circumferential surfaces of the tubes 13 in the axial direction.

As shown in FIG. 1 to FIG. 4, while each of the keys 17 and a corresponding one of the keyways 19 are aligned, the axis of rotation 14 is made to penetrate along the inner circumferential surfaces of all the tubes 13. Then, a fixing screw 21 is screwed into the tip of the axis of rotation 14 through a collar 20. At this time, all the tubes 13 are sandwiched between the tip collar 20 and the end face 16 of the melt-and-mix portion 11b, and held firmly affixed to each other without any gap by the force by which they are sandwiched.

By the above-described supporting structure, all the tubes 13 are coaxially joined on the axis of rotation 14, and thus, each of the tubes 13 and the axis of rotation 14 are integrally assembled. Because each of the tubes 13 and the axis of rotation 14 are integrally assembled, the screw main body 11 is formed as a rodlike member extending in the axial direction (longitudinal direction) from its basal end to its tip.

Accordingly, it becomes possible to rotate each of the tubes 13 on the axial line 10 together with the axis of rotation 14, that is, rotate the screw main body 11 on the axial line 10. Moreover, the basal end of the screw main body 11 corresponds to the basal end of the axis of rotation 14, and the tip of the screw main body 11 corresponds to the tip of the axis of rotation 14. In other words, the basal end of the screw main body 11 corresponds to the basal end of the extruder screw 2, which corresponds to one end of the barrel 4, and the tip of the screw main body 11 corresponds to the tip of the extruder screw 2, which corresponds to the other end of the barrel 4.

At this time, in the portion of the screw main body 11 in which the kneading portion 11c is provided, each of the tubes 13 serves as a structural element that defines the outside diameter D1 (see FIG. 3) of the screw main body 11. In the kneading portion 11c, the outside diameters D1 of the tubes 13 coaxially joined along the axis of rotation 14 are set to be equal to each other. The outside diameter D1 of the screw main body 11 (each of the tubes 13) is defined as a diameter passing through the axial line 10, which is the center of rotation of the axis of rotation 14.

The segmental screw 2 in which the outside diameter D1 of the screw main body 11 (each of the tubes 13) in the kneading portion 11c is a fixed value is thereby formed. In the segmental screw 2, screw elements can be held in free order and combination along the axis of rotation 14. With respect to the screw elements, for example, each of the tubes 13 on which at least parts of the flights 12, 25, and 26, which will be described later, are formed can be defined as one screw element.

By segmenting the screw 2, its convenience can be significantly improved with respect to, for example, changes and adjustments to the specifications or the upkeep and maintenance of the screw 2.

In the present embodiment, the structure in which the tubes 13 and the axis of rotation 14 are fixed and kept from rotating is not limited to the above-described combination of the keys 17 and the keyways 19. For example, a spline structure (not shown in the figures) may be used instead.

Moreover, the segmental screw 2 is coaxially accommodated in the cylinder 3 of the barrel 4. Specifically, the screw main body 11 with the screw elements held along the axis of rotation 14 is rotatably accommodated in the cylinder 3. In this state, a conveyance path 29 for conveying raw materials is formed between the outer circumferential surface of the screw main body 11 (the tubes 13) and the inner surface $3s$ of the cylinder 3. The conveyance path 29 has an annular sectional shape in the radial direction of the cylinder 3, and extends in the axial direction along the cylinder 3.

In the present embodiment, in the portion of the screw main body 11 in which the kneading portion 11$c$ is provided, the above-described introduction portion 15, conveyance portions 22 conveying raw materials introduced by the introduction portion 15, and barrier portions 23 limiting the flow of raw materials conveyed by each of the conveyance portions 22 are provided. The conveyance portions 22 and the barrier portions 23 are alternately disposed in the axial direction (longitudinal direction) of the screw main body 11 in the kneading portion 11$c$.

That is, a barrier portion 23 is disposed on the basal end side of the screw main body 11 in the kneading portion 11$c$. The barrier portion 23 is also used as the structure of the introduction portion 15. The conveyance portions 22 and the barrier portions 23 are alternately disposed from the barrier portion 23 toward the tip of the screw main body 11.

On the other hand, a discharge conveyance portion 24 is disposed on the tip side of the screw main body 11 in the kneading portion 11$c$. The discharge conveyance portion 24 is configured to convey kneaded materials kneaded in the cylinder 3 in the opposite direction to the conveyance direction of the other conveyance portions 22.

Each of the conveyance portions 22 is provided with the flight 25 spirally twisted. The flight 25 projects from the outer circumferential surface in the circumferential direction of the tubes 13 toward the conveyance path 29. The flight 25 is twisted from the basal end toward the tip of the screw main body 11 in the same direction as the rotation direction of the screw main body 11.

The discharge conveyance portion 24 is provided with the flight 26 spirally twisted. The flight 26 projects from the outer circumferential surface in the circumferential direction of the tubes 13 toward the conveyance path 29. The flight 26 is twisted in the opposite direction to the rotation direction of the screw main body 11.

Here, if raw materials are kneaded by rotating the screw main body 11 left-handed, the flight 25 of each of the conveyance portions 22 is twisted to convey the raw materials from the tip toward the basal end of the screw main body 11. That is, the twist direction of the flight 25 is set to be anticlockwise as in the case of a left-handed screw.

Moreover, if raw materials are kneaded by rotating the screw main body 11 left-handed, the flight 26 of the discharge conveyance portion 24 is twisted to convey the raw materials from the basal end toward the tip of the screw main body 11. That is, the twist direction of the flight 26 is set to be clockwise as in the case of a right-handed screw.

On the other hand, if raw materials are kneaded by rotating the screw main body 11 right-handed, the flight 25 of each of the conveyance portions 22 is twisted to convey the raw materials from the tip toward the basal end of the screw main body 11. That is, the twist direction of the flight 25 is set to be clockwise as in the case of a right-handed screw.

Moreover, if raw materials are kneaded by rotating the screw main body 11 right-handed, the flight 26 of the discharge conveyance portion 24 is twisted to convey the raw materials from the basal end toward the tip of the screw main body 11. That is, the twist direction of the flight 26 is set to be anticlockwise as in the case of a left-handed screw.

Figure 6:
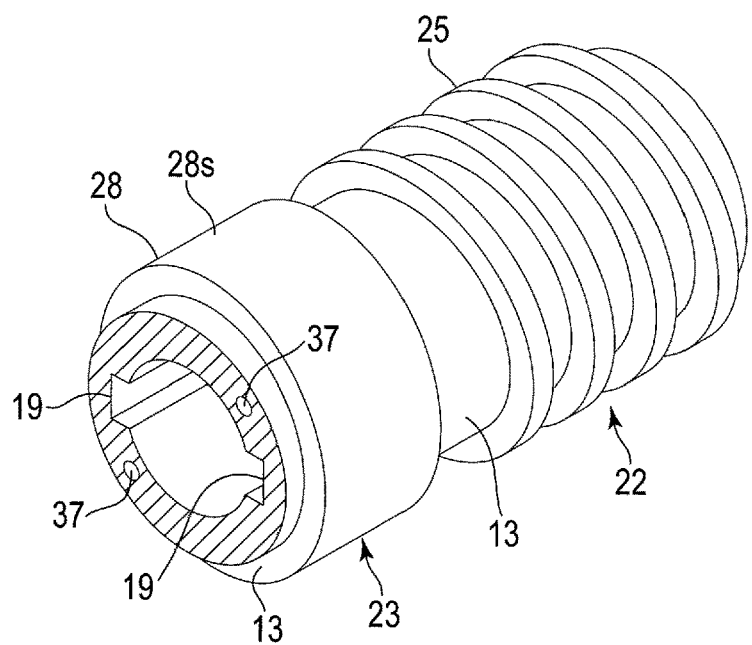
FIG. 6 is an expanded perspective view showing a part of a barrier annular body shown in FIG. 5.

Each of the barrier portions 23 is provided with a barrier annular body 28 continuing in the circumferential direction along the outer circumferential surface of the screw main body 11. The barrier annular body 28 comprises a cylindrical surface 28$s$ concentrically continuing in the circumferential direction with the axial line 10 as its center (see FIG. 6). The cylindrical surface 28$s$ projects from the outer circumferential surface in the circumferential direction of the tubes 13 toward the conveyance path 29.

In this case, a gap 27 (see FIG. 8) between an outside diameter portion 23$s$ of each of the barrier portions 23 and the inner surface 3$s$ of the cylinder 3 is preferably set to be within a range of 0.05 to 2 mm. More preferably, the gap 27 is set to be within a range of 0.05 to 0.7 mm. This can surely limit the conveyance of raw materials through the gap 27. Thus, the raw materials do not flow over each of the barrier portions 23.

Figure 20:
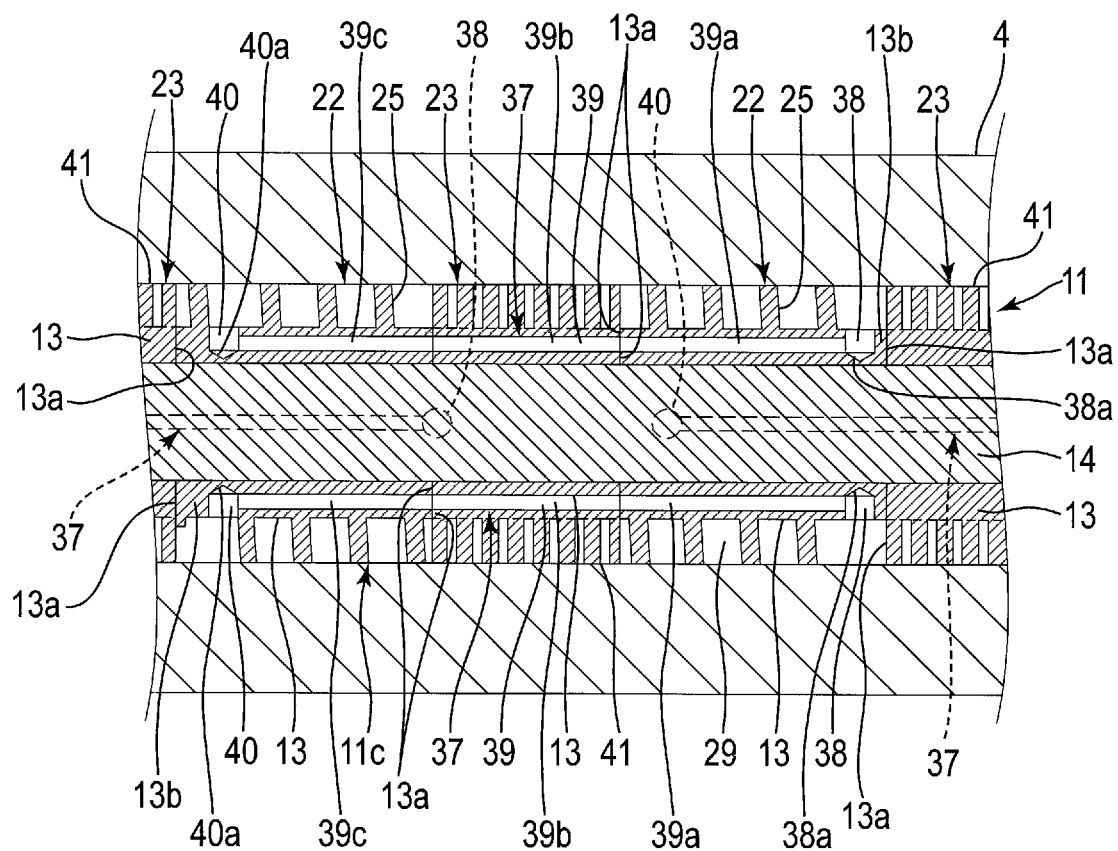
FIG. 20 is an expanded sectional view showing a part of a structure of a barrier portion provided with a flight in a modification of the present invention.

In each of the barrier portions 23, a spirally twisted flight 41 may be provided instead of the barrier annular body 28, for example, as shown in FIG. 20. The flight 41 projects from the outer circumferential surface in the circumferential direction of the tubes 13 toward the conveyance path 29. The flight 41 is twisted in the opposite direction to the rotation direction of the screw main body 11.

Here, if raw materials are kneaded by rotating the screw main body 11 left-handed, the flight 41 of each of the barrier portions 23 is twisted to convey the raw materials from the basal end toward the tip of the screw main body 11. That is, the twist direction of the flight 41 is set to be clockwise as in the case of a right-handed screw.

On the other hand, if raw materials are kneaded by rotating the screw main body 11 right-handed, the flight 41 of each of the barrier portions 23 is twisted to convey the raw materials from the basal end toward the tip of the screw main body 11. That is, the twist direction of the flight 41 is set to be anticlockwise as in the case of a left-handed screw.

In each of the barrier portions 23, the twist pitch of the flight 41 is set to be smaller than or equal to those of the flights 25 and 26 in the conveyance portions 22 and 24 described above. Moreover, the space between the apexes of the flights 25 and 26 and the inner surface 3$s$ of the cylinder 3 is set to be within the above-described range of the gap 27.

Incidentally, the lengths of the conveyance portions 22 and 24 in the axial direction of the screw main body 11 are set as appropriate in accordance with, for example, the kind of raw materials, the degree of kneading of raw materials, and the production of kneaded materials per unit time. The conveyance portions 22 and 24 are at least areas where the flights 25 and 26 are formed on the outer circumferential surfaces of the tubes 13, but are not limited to areas between the start points and the end points of the flights 25 and 26.

That is, areas outside the flights 25 and 26 of the outer circumferential surfaces of the tubes 13 may be regarded as the conveyance portions 22 and 24. For example, if a cylindrical spacer or a cylindrical collar is disposed at a position adjacent to the tubes 13 comprising the flights 25 and 26, the spacer or the collar also can be included in the conveyance portions 22 and 24.

In addition, the lengths of the barrier portions 23 in the axial direction of the screw main body 11 are set as appropriate in accordance with, for example, the kind of raw materials, the degree of kneading of raw materials, and the production of kneaded materials per unit time. The barrier portions 23 function to stop the flow of raw materials fed by the conveyance portions 22. That is, the barrier portions 23 are adjacent to the conveyance portions 22 on the downstream side in the conveyance direction of raw materials, and configured to prevent raw materials fed by the conveyance portions 22 from being conveyed through the above-described gap 27.

In the portion of the above-described screw 2 (the screw main body 11) in which the kneading portion 11c is provided, each of the flights 25 and 26 and the barrier annular body 28 (the cylindrical surface 28s) project from the outer circumferential surfaces of the tubes 13 having the outside diameters D1 equal to each other toward the conveyance path 29. Thus, the outer circumferential surface in the circumferential direction of each of the tubes 13 defines the root diameter of the screw 2 in the kneading portion 11c. The root diameter corresponds to the above-described outside diameter D1, and is kept at a fixed value over the total length of the portion of the screw main body 11 in which the kneading portion 11c is provided.

In this case, the root diameter of the kneading portion 11c may be increased to reduce the depth of a root. According to the above-described structure, kneaded materials produced by the screw 2 can be stably discharged from the discharge port 7. The depth of the root can be defined as a height in the radial direction from the outer circumferential surface of the screw main body 11 (the tubes 13) to the outside diameter portions of the flights 25, 26, and 41 and the barrier annular body 28 (the cylindrical surface 28s).

Moreover, paths 37 extending in the axial direction are provided inside the portion of the screw main body 11 in which the kneading portion 11c is provided. The paths 37 are arranged in the axial direction and the circumferential direction of the screw main body 11. The figures show, as an example, the structure in which two paths 37 disposed at regular intervals in the circumferential direction of the screw main body 11 are arranged in the axial direction of the screw main body 11 while they are made to differ in phase by 90°.

The paths 37 are provided at positions eccentric to the axial line 10, which is the center of rotation of the screw 2. That is, the paths 37 are shifted from the axial line 10. Thus, the paths 37 revolve around the axial line 10 with the rotation of the screw main body 11.

With respect to the shapes of the paths 37, their sectional shapes can be, for example, circular, rectangular, or elliptical, as long as raw materials can flow therethrough. The figures show, as an example, the paths 37 whose sections are circular holes. In this case, the inside diameter (bore) of the holes is preferably set to be greater than or equal to 1 mm but less than 6 mm. More preferably, the inside diameter (bore) of the holes is set to be greater than or equal to 1 mm but less than 5 mm.

Inside the screw main body 11 (the kneading portion 11c), the tubes 13 of the conveyance portions 22 and the barrier portions 23 comprise tubular wall surfaces 30 (see FIG. 3 and FIG. 4) defining the paths 37, which are holes. That is, the paths 37 are holes composed of hollow spaces only. The wall surfaces 30 continuously surround the hollow paths 37 in the circumferential direction. The paths 37 are thereby formed as hollow spaces which allow only the flow of raw materials. In other words, inside the paths 37, there are no other elements constituting the screw main body 11. In this case, the wall surfaces 30 revolve around the axial line 10 without rotating on the axial line 10, when the screw main body 11 rotates.

According to the above-described paths 37, when raw materials conveyed through the conveyance path 29 by each of the conveyance portions 22 flow through the paths 37, "extension action", caused when the raw materials pass from a wide place (the conveyance path 29) to a narrow place (the paths 37), can be effectively imparted to the raw materials. Thus, the paths 37 are defined as portions which impart extension action to raw materials (extension action regions).

Hereinafter, a specific structure of the above-described paths 37 will be described.

Figure 5:
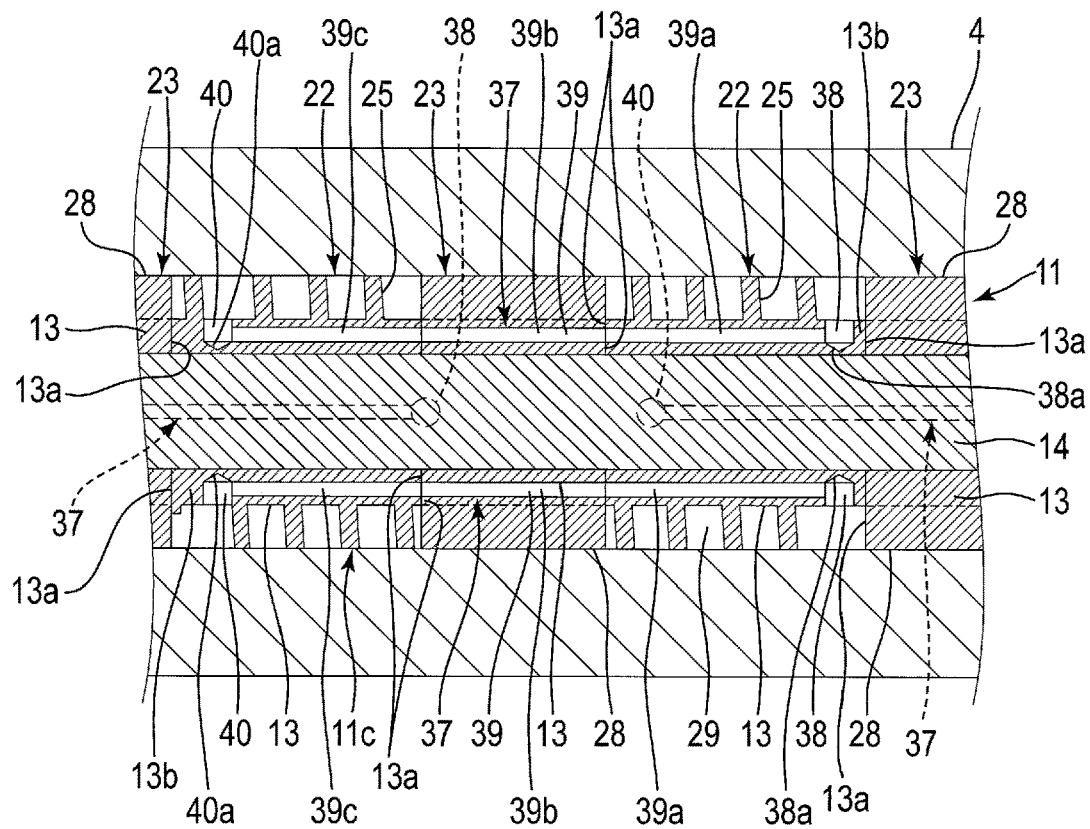
FIG. 5 is an expanded sectional view showing a part of a structure of a path formed entirely through a tube of a barrier portion and extending into tubes of two conveyance portions.

As shown in FIG. 2 and FIG. 5, in the extruder screw 2 according to the present embodiment, the paths 37 are provided with a space therebetween in the axial direction (longitudinal direction) inside the screw main body 11 (the kneading portion 11c) in which the conveyance portions 22 and the barrier portions 23 are alternately arranged in the axial direction (longitudinal direction). Raw materials, the conveyance of which is limited by the barrier portions 23, flow into each of the paths 37. In each of the paths 37, the raw materials flow in the opposite direction to the conveyance direction of the conveyance portions 22. By the above-described screw structure, the screw 2 comprising the screw main body 11 (the kneading portion 11c) having the function of continuously imparting shearing action and extension action to raw materials is achieved.

Here, if we focus on one barrier portion 23 and two conveyance portions 22 adjacent to both sides of the barrier portion 23 in the above-described screw structure, one path 37 is provided entirely through a tube 13 of the barrier portion 23 and extends into tubes 13 of the two conveyance portions 22. This structure can be regarded as one structurally united unit.

The screw main body 11 (the kneading portion 11c) according to the present embodiment is formed by arranging units identical to the unit in the axial direction (longitudinal direction). The unidirectional screw structure in which raw materials never pass through places where they have once passed can be thereby achieved.

In other words, the above-described one unit can be regarded as one functionally united module. As the functions of one module, for example, the function of imparting shearing action to raw materials, the function of imparting extension action to raw materials, the function of stopping the conveyance of raw materials with the barrier portions 23, the function of guiding raw materials, the pressure on which has been increased by the barrier portions 23, to the paths 37, and the function of forming a raw-material receiver R in which the filling rate of raw materials is 100% just before the barrier portions 23 are assumed.

Moreover, in the above-described screw structure, the paths 37 each comprise an entrance 38, an exit 40, and a path main body 39 connecting the entrance 38 and the exit 40. The entrance 38 and the exit 40 are provided to be remote from both sides of the one barrier portion 23 in the above-described one unit. That is, the entrance 38 is provided on one side of the path main body 39 (portion closer to the basal end of the screw main body 11). The exit 40 is provided on the other side of the path main body 39 (portion closer to the tip of the screw main body 11).

Specifically, in the conveyance portion 22 adjacent to the barrier portion 23 from the basal end side of the screw main body 11, the entrance 38 is opened in the outer circumferential surface near the downstream end of the conveyance portion 22 with respect to a conveyance direction of the conveyance portion 22. On the other hand, in the conveyance portion 22 adjacent to the barrier portion 23 from the tip side of the screw main body 11, the exit 40 is opened in the outer circumferential surface near the upstream end of the conveyance portion 22 with respect to the conveyance direction of the conveyance portion 22.

The positions where the entrance 38 and the exit 40 are formed can be freely set within the conveyance portions 22. The figures show, as an example, the structure in which the entrance 38 and the exit 40 are formed at the furthest ends from both sides of the one barrier portion 23.

The entrance 38 is a hole bored in the radial direction in the outer circumferential surface of the tubes 13 (the screw main body 11) in the kneading portion 11*c*. The entrance 38 can be formed by, for example, machining with a drill. As a result, a bottom portion 38*a* of the entrance 38 is formed as an inclined surface shaved off into the shape of a cone by the tip of the drill. In other words, the bottom portion 38*a* in the shape of a cone is an inclined surface widening toward the outer circumferential surface of the screw main body 11.

The exit 40 is a hole bored in the radial direction in the outer circumferential surface of the tubes 13 (the screw main body 11) in the kneading portion 11*c*. The exit 40 can be formed by, for example, machining with a drill. As a result, a bottom portion 40*a* of the exit 40 is formed as an inclined surface shaved off into the shape of a cone by the tip of the drill. In other words, the bottom portion 40*a* in the shape of a cone is an inclined surface widening toward the outer circumferential surface of the screw main body 11.

The path main body 39 is formed entirely through a tube 13 of one barrier portion 23 and extends into tubes 13 of two conveyance portions 22 adjacent to both sides of the barrier portion 23. The path main body 39 is composed of first to third portions 39*a*, 39*b*, and 39*c*.

The first portion 39*a* is formed in the tube 13 of the conveyance portion 22 adjacent to the barrier portion 23 from the basal end side of the screw main body 11. The first portion 39*a* extends parallel to the axial line 10. One end (the barrier portion 23 side) of the first portion 39*a* is opened in an end face 13*a* of the tube 13. The other end (the opposite side to the barrier portion 23) of the first portion 39*a* is closed by an end wall 13*b* of the tube 13. Moreover, the other end of the first portion 39*a* communicates with and is connected to the above-described entrance 38.

The second portion 39*b* is formed in the tube 13 of the barrier portion 23. The second portion 39*b* extends parallel to the axial line 10. Both ends of the second portion 39*b* are opened in end faces 13*a* of both sides of the tube 13.

The third portion 39*c* is formed in the tube 13 of the conveyance portion 22 adjacent to the barrier portion 23 from the tip side of the screw main body 11. The third portion 39*c* extends parallel to the axial line 10. One end (the barrier portion 23 side) of the third portion 39*c* is opened in an end face 13*a* of the tube 13. The other end (the opposite side to the barrier portion 23) of the third portion 39*c* is closed by an end wall 13*b* of the tube 13. Moreover, the other end of the third portion 39*c* communicates with and is connected to the above-described exit 40.

The path main body 39 can be formed by constricting the three tubes 13 in which the first to third portions 39*a*, 39*b*, and 39*c* are formed in the axial direction, and firmly affixing the end faces 13*a* thereof to each other. In this state, the path main body 39 extends straight and continuously without branching on the way in the axial direction of the screw main body 11. In addition, both sides of the path main body 39 communicate with and are connected to the entrance 38 and the exit 40 described above.

In this case, the bore of the path main body 39 may be set to be smaller than those of the entrance 38 and the exit 40, or may be set to be equal to them. In either case, the path sectional area defined by the bore of the path main body 39 is set to be much smaller than the annular sectional area in the radial direction of the above-described annular conveyance path 29.

In the present embodiment, each of the tubes 13 on which at least parts of the flights 25, 26, and 41 and the barrier annular body 28 are formed can be regarded as a screw element corresponding to one of the conveyance portions 22 and 24 and the barrier portions 23.

Thus, the portion of the screw main body 11 in which the kneading portion 11*c* is provided can be formed by sequentially disposing the tubes 13 as screw elements on the outer circumference of the axis of rotation 14. Therefore, the conveyance portions 22 and 24 and the barrier portions 23 can be exchanged and rearranged in accordance with, for example, the degree of kneading of raw materials, and the exchange and the rearrangement can be easily performed.

Moreover, by constricting the tubes 13 as screw elements in the axial direction and firmly affixing them to each other, the path main body 39 of each of the paths 37 is formed, and the entrance 38 and the exit 40 of each of the paths 37 are integrally connected through the path main body 39. Thus, in order to form the paths 37 in the screw main body 11, it suffices that a process for providing the paths 37 is performed for each of the tubes 13 having a length sufficiently shorter than the total length of the screw main body 11 (the kneading portion 11*c*). Thus, the paths 37 can be easily processed and handled when being formed.

Moreover, in the screw structure of the extruder screw 2, the above-described introduction portion 15 has a structure in which raw materials conveyed from the melt-and-mix portion 1*ib* are continuously introduced to the kneading portion 11*c*. FIG. 1 and FIG. 2 show an example of the introduction structure. That is, the introduction portion 15 comprises an introduction tube 13*p* instead of the conveyance portion 22 on the upstream side in the above-described unit. The entrance 38 communicating with the path 37 is formed in the outer circumferential surface of the introduction tube 13*p*. The introduction tube 13*p* is adjacently disposed between the barrier portion 23 provided at the basal end of the screw main body 11 in the kneading portion 11*c* and the end face 16 of the melt-and-mix portion 11*b*.

According to the introduction structure, the conveyance of raw materials conveyed from the melt-and-mix portion 11*b* is limited by the barrier portion 23, and the pressure on the raw materials is thereby increased. The raw materials flow into the entrance 38 of the introduction tube 13*p* and flow through the path 37 (the path main body 39), and then flow out of the exit 40 of the conveyance portion 22 on the downstream side. The raw materials conveyed from the melt-and-mix portion 11*b* can be thereby continuously introduced to the kneading portion 11*c*.

Next, the operation of kneading raw materials with the single screw extruder 2 will be described. In this description of the operation, "the outer circumferential surface of the screw main body 11" means an outer circumferential surface in the circumferential direction not including both end faces in the longitudinal direction of the screw main body 11. Moreover, in this description of the operation, it is assumed that kneading is performed while the extruder screw 2 is rotated left-handed in an anticlockwise direction, for example, at a rotational rate of 50 to 100 rpm.

Figure 7:
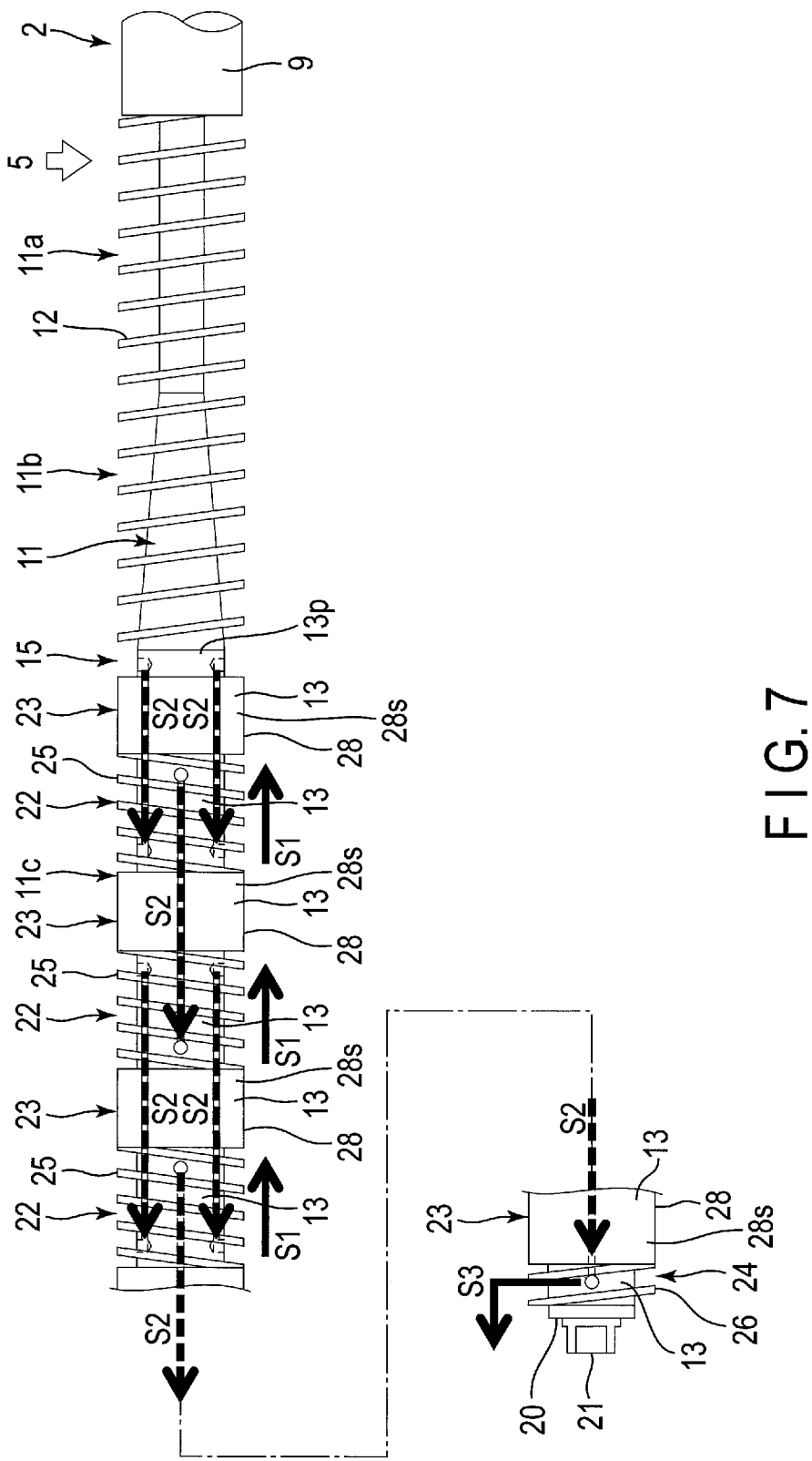
FIG. 7 is a diagram schematically showing a flowing state of raw materials produced by the extruder screw.
Figure 8:
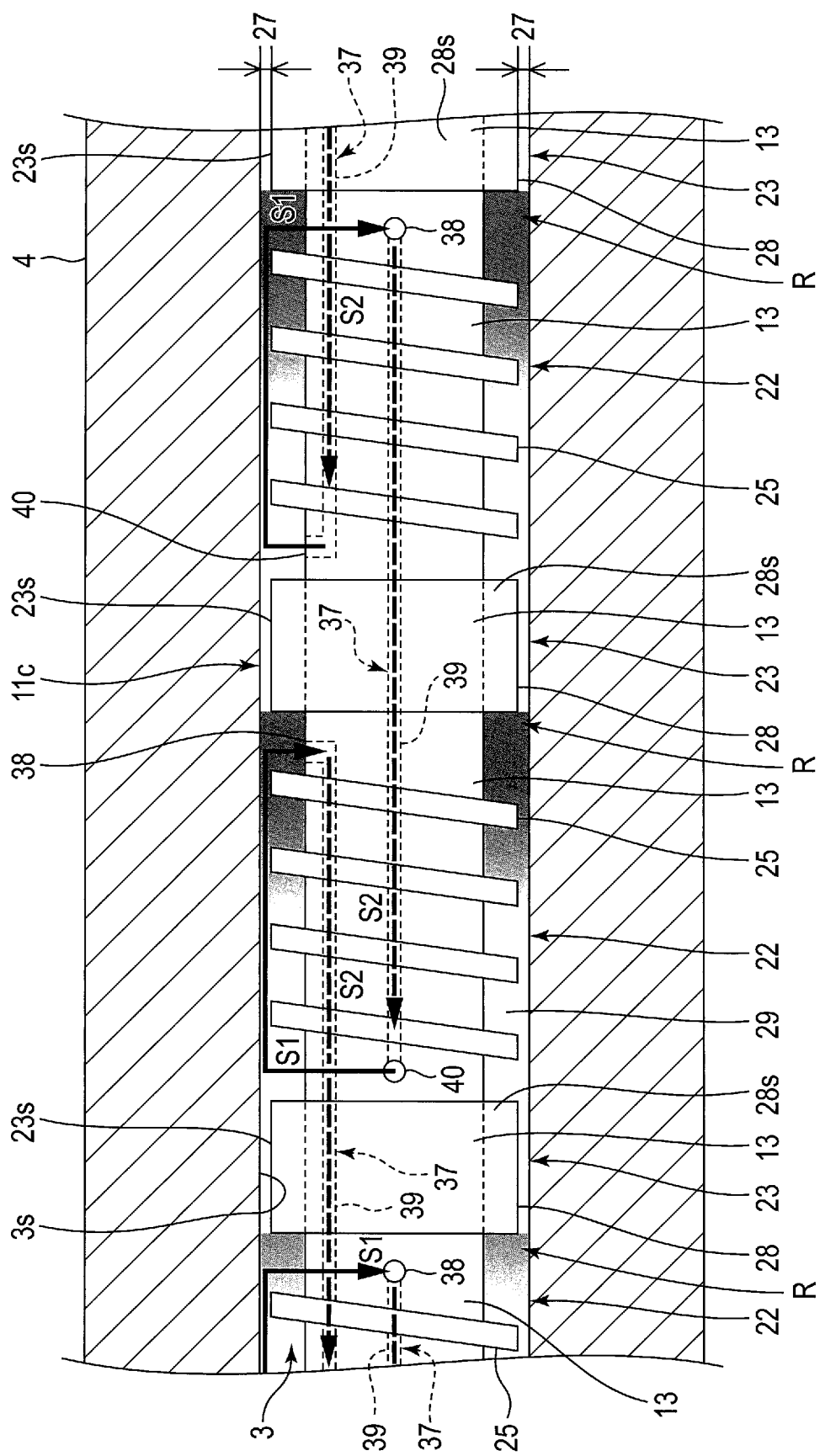
FIG. 8 is an expanded sectional view showing a part of the flowing state of raw materials in a cylinder of the extruder.

As shown in FIG. 7 and FIG. 8, in a state in which the extruder screw 2 is rotated left-handed, the materials 6 (see FIG. 1) are supplied from the supply port 5 to the cylinder 3.

Resin in the form of pellets supplied to the cylinder 3 is conveyed from the transfer portion 11a to the melt-and-mix portion 11b by the flight 12. In the melt-and-mix portion 11b, the resin is subjected to compression mainly from the gap that continuously becomes narrower while being heated by the heater. As a result, raw materials obtained by melting and mixing two kinds of resin are conveyed from the melt-and-mix portion 11b.

The raw materials conveyed from the melt-and-mix portion 11b are introduced to the kneading portion 11c through the introduction portion 15. That is, the conveyance of the raw materials conveyed from the melt-and-mix portion 11b is limited, and the pressure on the raw materials is thereby increased. The raw materials flow into the entrance 38 of the introduction tube 13p and flow through the path main body 39, and then flow out of the exit 40 of the conveyance portion 22 on the downstream side.

The raw materials which have flowed out of the exit 40 are continuously supplied to the outer circumferential surface of the screw main body 11 in the kneading portion 11c. The supplied raw materials are conveyed in an S1-direction from the tip toward the basal end of the screw main body 11 by the flights 25 of the conveyance portions 22.

During the conveyance in the S1-direction, "shearing action", caused by a difference in speed between the flights 25 of the conveyance portions 22 rotating along the conveyance path 29 and the inner surface 3s of the cylinder 3, is imparted to the raw materials, and stirring action, caused by the rotation of the spiral flights 25, is imparted to them. The degree of kneading of the raw materials is thereby promoted.

The conveyance of the raw materials conveyed in the S1-direction is limited by the barrier portions 23. That is, the barrier portions 23 act to press back the raw materials from the basal end toward the tip of the screw main body 11 in the opposite direction to the S1-direction. As a result, the flow of raw materials is stopped by the barrier portions 23.

At this time, because the flow of raw materials is stopped, the pressure on the raw materials is increased. Specifically, FIG. 8 shows the filling rate of raw materials at the places in the conveyance path 29, which correspond to the conveyance portions 22 of the screw main body 11 (the kneading portion 11c), with gradations. That is, in the conveyance path 29, the filling rate of raw materials becomes greater as the tone becomes darker. As is clear from FIG. 8, the filling rate of raw materials becomes greater as they approach the barrier portions 23 in the conveyance path 29 corresponding to the conveyance portions 22. Just before the barrier portions 23, the filling rate of raw materials is 100%.

Thus, just before the barrier portions 23, the "raw-material receiver R" in which the filling rate of raw materials is 100% is formed. In the raw-material receiver R, the flow of raw materials is stopped, and thus, the pressure on the raw materials is increased. The raw materials, the pressure on which has been increased, continuously flow into the path main body 39 from the entrance 38 opening in the outer circumferential surfaces of the conveyance portions 22 (the tubes 13), and flow back through the path main body 39 in an S2-direction from the basal end toward the tip of the screw main body 11 in the opposite direction to the S1-direction.

As described above, the path sectional area defined by the bore of the path main body 39 is much smaller than the annular sectional area of the conveyance path 29 in the radial direction of the cylinder 3. From another point of view, a widening area based on the bore of the path main body 39 is much smaller than that of the annular conveyance path 29. Therefore, the raw materials are rapidly squeezed when flowing from the entrance 38 into the path main body 39, and thus, "extension action" is imparted to the raw materials.

Moreover, since the path sectional area is sufficiently smaller than the annular sectional area, raw materials collecting in the raw-material receiver R do not disappear. That is, some of the raw materials collecting in the raw-material receiver R continuously flow into the entrance 38. In the meantime, new raw materials are fed toward the barrier portions 23 by the flights 25 of the conveyance portions 22. As a result, the filling rate just before the barrier portions 23 in the raw-material receiver R is thereby kept at 100% all the time. At this time, even if the amount of raw materials conveyed by the flights 25 somewhat changes, the change is absorbed by raw materials remaining in the raw-material receiver R. Raw materials can be thereby continuously and stably supplied to the path main body 39. Thus, in the path main body 39, extension action can be uninterruptedly and continuously imparted to the raw materials.

The raw materials which have passed through the path main body 39 flow out of the exit 40 toward the outer circumferential surface of the screw main body 11 (the kneading portion 11c). On the screw main body 11 (the kneading portion 11c), the conveyance portions 22 and the barrier portions 23 described above are alternately arranged in the axial direction. Thus, when the above-described series of shearing and extension operations is repeated, raw materials in the cylinder 3 are continuously conveyed from the basal end toward the tip of the screw main body 11 (the kneading portion 11c) in a state in which a shearing flow and an extension flow are repeated. The degree of kneading of raw materials is thereby increased.

Then, kneaded materials which have flowed out of the exit 40 formed in the discharge conveyance portion 24 are conveyed in an S3-direction by the flight 26 of the discharge conveyance portion 24, and then continuously extruded from the discharge port 7 (see FIG. 1 and FIG. 2).

As described above, according to the present embodiment, the extruder screw 2 has the function of imparting extension action to raw materials. Thus, the degree of kneading of raw materials can be improved without elongating the screw 2 or the single screw extruder.

According to the present embodiment, shearing action and extension action can be continuously imparted to raw materials more than once. Accordingly, the number of times shearing action and extension action are imparted to raw materials and the time for which shearing action and extension action are imparted to raw materials can be increased. As a result, the degree of kneading of the raw materials can be more accurately controlled than in the conventional art.

According to the present embodiment, in an existing extruder screw wherein a supply portion, a compression portion, and a measuring portion are provided from its basal end toward its tip, and a path through which raw materials flow is not provided inside, the supply portion is replaced with the transfer portion 11a, the compression portion is replaced with the melt-and-mix portion 11b, and the measuring portion is replaced with the kneading portion 11c in which the conveyance portions 22, the barrier portions 23, and the paths 37 are disposed in combination. The existing extruder screw can thereby have both of the function of imparting shearing action and the function of imparting extension action. As a result, the extruder screw 2, the utility of which is maintained and improved, can be achieved.

In addition, the extruder screw 2 of the present embodiment has the unidirectional screw structure in which raw materials never pass through places where they have once passed in the kneading portion 11c. Thus, in the kneading portion 11c, extension action can be imparted to all the raw materials thoroughly. Moreover, according to the unidirectional screw structure, a flow of raw materials in a different kneaded state located ahead of or behind a particular flow of raw materials is not mixed into the particular flow of raw materials. All the raw materials can be thereby kneaded thoroughly and uniformly.

Furthermore, according to the present embodiment, in the portion in which the kneading portion 11c is provided, the outside diameter D1 of the screw main body 11 (each of the tubes 13) is set at a fixed value, in other words, the root diameter of the screw 2 is set at a fixed value. Thus, the segmental screw 2 in which screw elements can be held in free order and combination can be achieved. By segmenting the screw 2, its convenience can be significantly improved with respect to, for example, changes and adjustments to the specifications or the upkeep and maintenance of the screw 2.

Moreover, according to the present embodiment, the sectional area of the paths 37 (the path main bodies 39) is set to be much smaller than that of the conveyance path 29 for conveying raw materials. Thus, extension action can be uniformly, stably and efficiently imparted to raw materials passing through the paths 37 (the path main bodies 39).

While one of the embodiments of the present invention has been hereinabove described, the present invention is not limited to the one embodiment. The following modifications are also included in the technical scope of the present invention.

In the above-described one embodiment, FIG. 1, FIG. 2, and FIG. 5 show the paths 37 in which both sides of the path main body 39 are connected to the entrance 38 and the exit 40 at positions shifted from the bottom portions 38a and 40a of the entrance 38 and the exit 40. However, the connection relationship between the path main body 39 and the entrance 38 and the exit 40 is not limited to that of the above-described one embodiment, and the following connection relationship is also included in the technical scope of the present invention.

FIG. 9 to FIG. 14 show, as examples, the path 37 in which both sides of the path main body 39 are connected to the bottom portions 38a and 40a of the entrance 38 and the exit 40. Specifically, one side of the path main body 39, that is, the above-described other end of the first portion 39a, is connected to the bottom portion 38a of the entrance 38. Moreover, the other side of the path main body 39, that is, the above-described other end of the third portion 39c, is connected to the bottom portion 40a of the exit 40.

Figure 9:
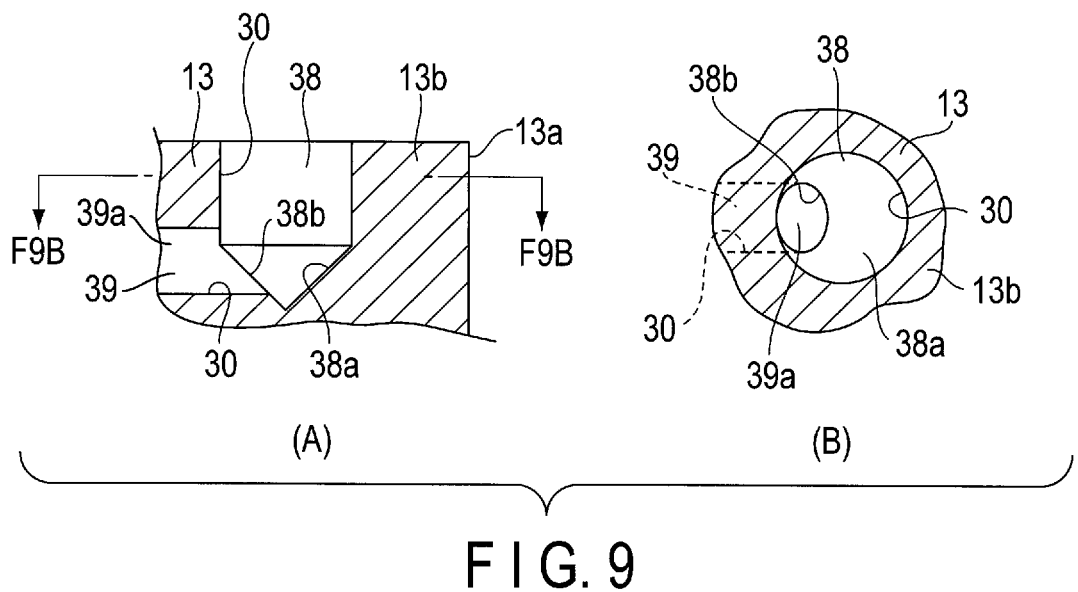
FIG. 9 (A) is an expanded sectional view showing a structure of an entrance portion of the path in a modification of the present invention, and FIG. 9 (B) is a sectional view along line F9B-F9B of FIG. 9 (A).
Figure 10:
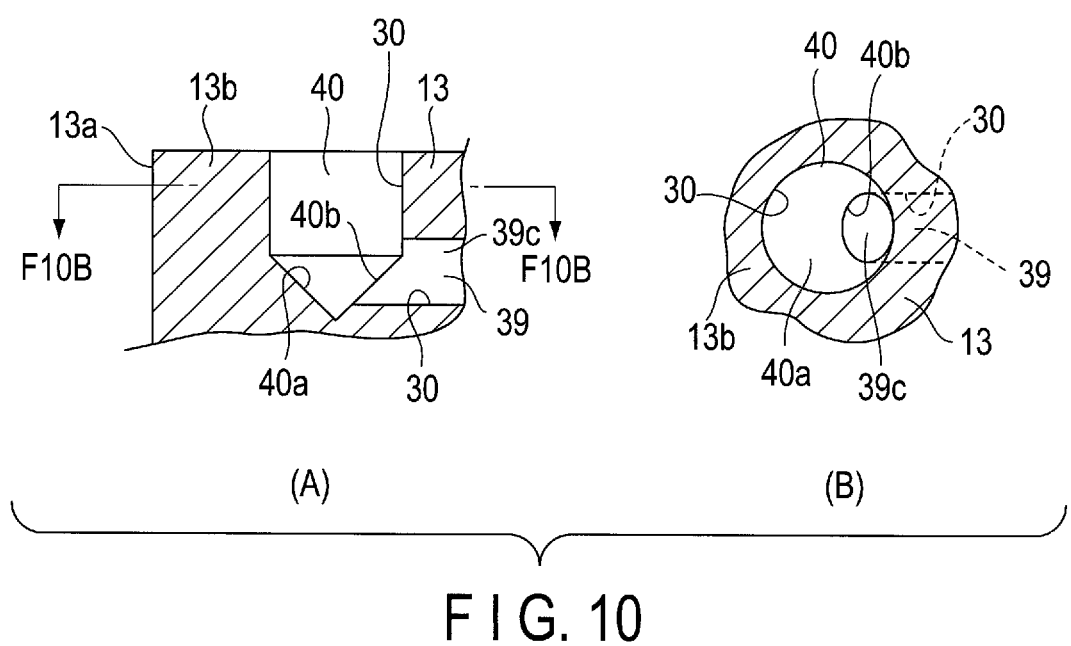
FIG. 10 (A) is an expanded sectional view showing a structure of an exit portion of the path in the modification of the present invention, and FIG. 10 (B) is a sectional view along line F10B-F10B of FIG. 10 (A).

FIGS. 9 (A) and (B) and FIGS. 10 (A) and (B) show the path 37 according to a first modification. In the path 37, an end face on one side of the path main body 39 (the other end of the first portion 39a) is connected to the bottom portion 38a of the entrance 38. In the bottom portion 38a, one opening 38b communicating with the path main body 39 (the first portion 39a) is formed. On the other hand, an end face on the other side of the path main body 39 (the other end of the third portion 39c) is connected to the bottom portion 40a of the exit 40. In the bottom portion 40a, one opening 40b communicating with the path main body 39 (the third portion 39c) is formed.

The one opening 38b of the entrance 38 is formed in a region facing the bottom portion 38a having a shape widening toward the outer circumferential surface of the screw main body 11. On the other hand, the one opening 40b of the exit 40 is formed in a region facing the bottom portion 40a having a shape widening toward the outer circumferential surface of the screw main body 11.

In this case, raw materials which have flowed into the entrance 38 are guided toward the opening 38b along the inclination of the bottom portion 38a. As a result, the raw materials do not remain in the entrance 38, and all of them continuously and smoothly flows into the path main body 39. The raw materials which have passed through the path main body 39 then flow into the exit 40. The raw materials which have flowed into the exit 40 are guided toward the outer circumferential surface of the screw main body 11 along the inclination of the bottom portion 40a. As a result, the raw materials do not remain in the exit 40, and all of them continuously and smoothly flows out toward the outer circumferential surface of the screw main body 11.

Accordingly, the raw materials can be prevented from locally remaining in the path 37 while extension action is continuously imparted to the raw materials passing through the path 37 thoroughly and uniformly.

FIGS. 11 (A) and (B) and FIGS. 12 (A) and (B) show the path 37 according to a second modification. In the path 37, a portion closer to an end face 39s on one side of the path main body 39 (the other end of the first portion 39a), that is, a portion located short of the end face 39s, is connected to the bottom portion 38a of the entrance 38. In the bottom portion 38a, two openings 38b communicating with the path main body 39 (the first portion 39a) are formed. On the other hand, a portion closer to an end face 39s on the other side of the path main body 39 (the other end of the third portion 39c), that is, a portion located short of the end face 39s, is connected to the bottom portion 40a of the exit 40. In the bottom portion 40a, two openings 40b communicating with the path main body 39 (the third portion 39c) are formed.

The two openings 38b of the entrance 38 are formed in a region facing the bottom portion 38a having a shape widening toward the outer circumferential surface of the screw main body 11. On the other hand, the two openings 40b of the exit 40 are formed in a region facing the bottom portion 40a having a shape widening toward the outer circumferential surface of the screw main body 11. The operations and advantages of the path 37 according to the second modification are the same as those of the path 37 according to the above-described first modification, and thus, description thereof is omitted.

In the above-described one embodiment and modifications, it has been assumed that the opening directions of the entrance 38 and the exit 40 are orthogonal to the axial line 10. However, the opening directions are not limited to these. For example, as shown in FIGS. 13 (A) and (B) and FIGS. 14 (A) and (B), the opening directions of the entrance 38 and the exit 40 may be set to be directions crossing the axial line 10 (directions indicated by dotted lines). In this case, entrances 38 and 38-1 and exits 40 and 40-1 may be provided by opening both sides of the path main body 39 in directions.

Moreover, the entrance 38 is preferably formed to be further recessed than the outer circumferential surface of the screw main body 11. This enables raw materials to more easily flow into the entrance 38.

In addition, in the above-described one embodiment, it has been assumed that the paths 37 (specifically, the path main bodies 39) are formed inside the screw main body 11 (the tubes 13) in the kneading portion 11c. However, instead, the paths 37 (the path main bodies 39) may be formed at boundaries between each of the tubes 13 and the axis of rotation 14 when the axis of rotation 14 is made to penetrate along the inner circumferential surface of each of the tubes 13 constituting the screw main body 11 (the kneading portion 11c). FIG. 15 to FIG. 18 show the structure of a portion corresponding to FIG. 3 as the structure of the present modification.

Figure 15:
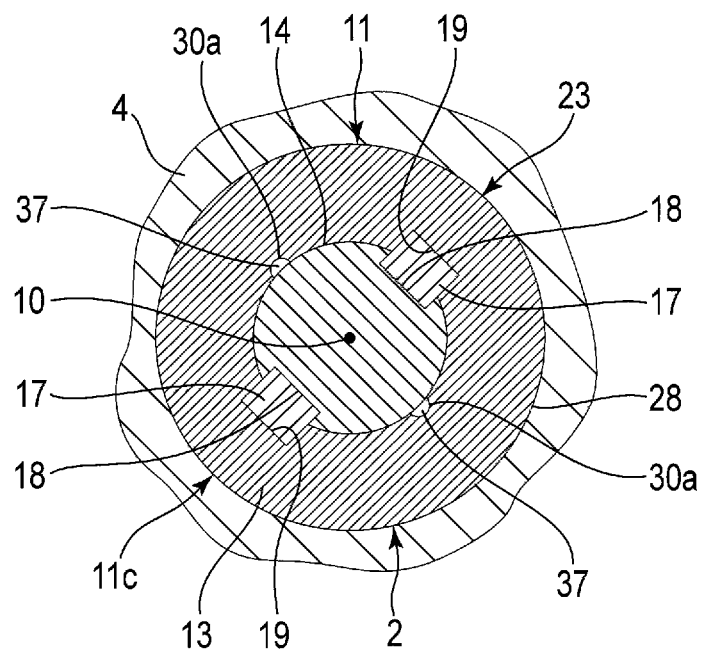
FIG. 15 is a longitudinal sectional view schematically showing the structure of the extruder screw in which paths are provided along an inner circumferential surface of a tube constituting the kneading portion in a modification of the present invention.

The paths 37 shown in FIG. 15 are composed of wall surfaces 30a formed by recessing parts of the inner circumferential surfaces of the tubes 13 into the shape of depressions in the axial direction. In this case, the paths 37 surrounded by the wall surfaces 30a and the outer circumferential surface of the axis of rotation 14 can be defined by making the axis of rotation 14 penetrate along the inner circumferential surfaces of the tubes 13.

Figure 16:
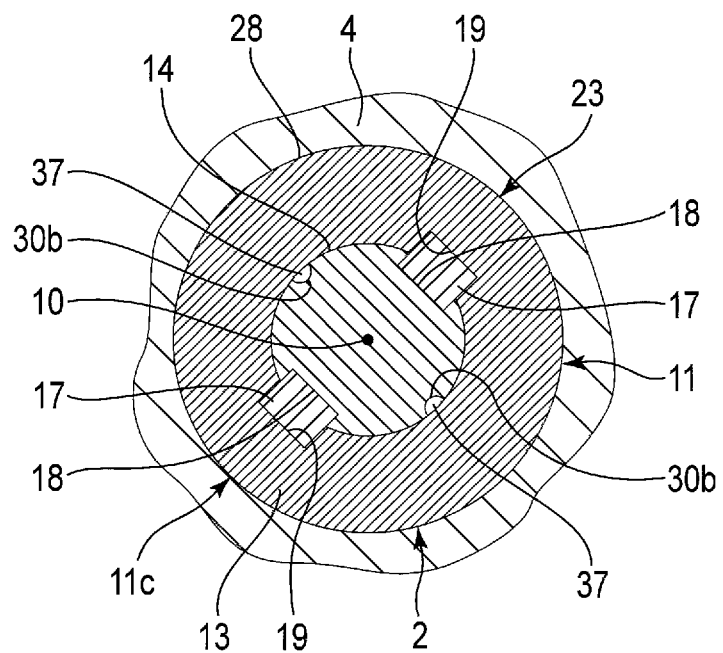
FIG. 16 is a longitudinal sectional view schematically showing the structure of the extruder screw in which the paths are provided along an outer circumferential surface of an axis of rotation constituting the kneading portion in a modification of the present invention.

The paths 37 shown in FIG. 16 are composed of wall surfaces 30b formed by recessing parts of the outer circumferential surface of the axis of rotation 14 into the shape of depressions in the axial direction. In this case, the paths 37 surrounded by the wall surfaces 30b and the inner circumferential surfaces of the tubes 13 can be defined by making the axis of rotation 14 penetrate along the inner circumferential surfaces of the tubes 13.

Figure 17:
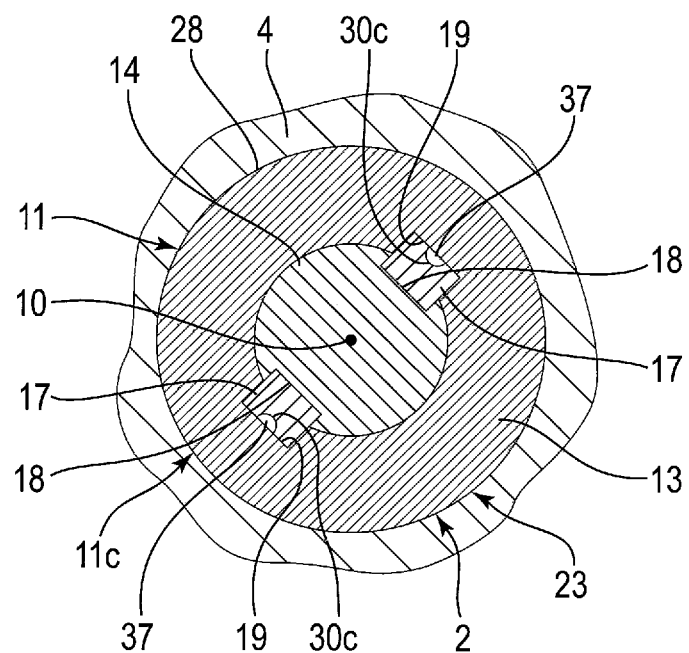
FIG. 17 is a longitudinal sectional view schematically showing the structure of the extruder screw in which the paths are provided along surfaces of keys constituting the kneading portion in a modification of the present invention.

The paths 37 shown in FIG. 17 are composed of wall surfaces 30c formed by recessing parts of the outer peripheral surfaces of the keys 17 into the shape of depressions in the axial direction. In this case, the paths 37 surrounded by the wall surfaces 30c and groove bottom surfaces of the keyways 19 can be defined by making the axis of rotation 14 penetrate along the inner circumferential surfaces of the tubes 13.

In any of the paths 37, the wall surfaces 30a, 30b, and 30c can be formed simply by processing portions exposed to the outside into the shape of depressions, and thus, the formation can be easily performed. In this case, various shapes, for example, semicircular, triangular, elliptical, and rectangular, can be applied as the shapes of the wall surfaces 30a, 30b, and 30c in the shape of depressions.

Figure 18:
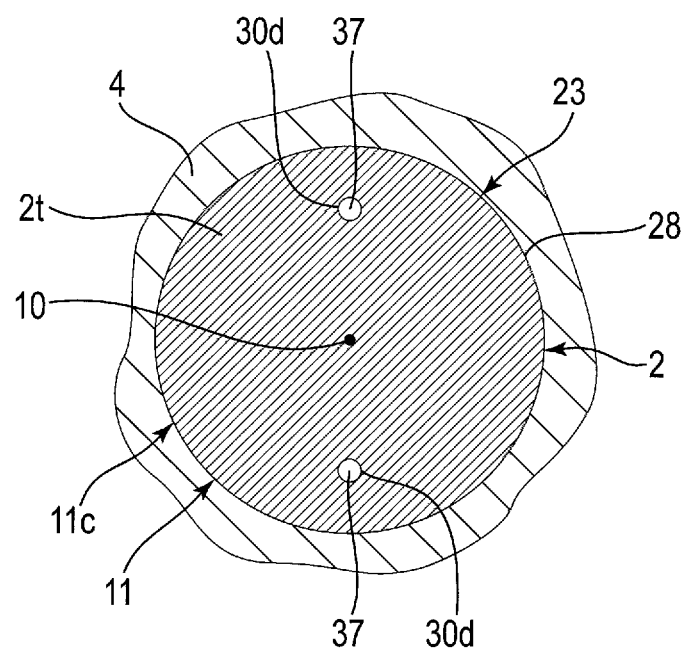
FIG. 18 is a longitudinal sectional view schematically showing the structure of the extruder screw in which a screw main body is formed of one axial member in a modification of the present invention.

In addition, in the above-described one embodiment, the portion of the screw main body 11 in which the kneading portion 11c is provided is composed of the tubes 13 and the axis of rotation 14. However, the screw main body 11 (the kneading portion 11c) may be composed of one straight axial member 2t as shown in FIG. 18 instead. In this case, the solid screw main body 11 (the kneading portion 11c) is provided with the above-described conveyance portions, barrier portions, and paths 37. The figure shows, as an example, the pair of paths 37 provided at positions eccentric to the axial line 10 and defined by tubular wall surfaces 30d, but do not limit the disposition of each of the paths 37.

Moreover, in the above-described one embodiment, the single screw extruder 1 wherein the one extruder screw 2 is rotatably inserted in the cylinder 3 of the barrel 4 has been assumed. However, the technical idea of the present invention can also be applied to a twin screw extruder 34 wherein two extruder screws 31 are rotatably inserted in a cylinder 33 of a barrel 32, and the same advantages can be achieved.

Figure 19:
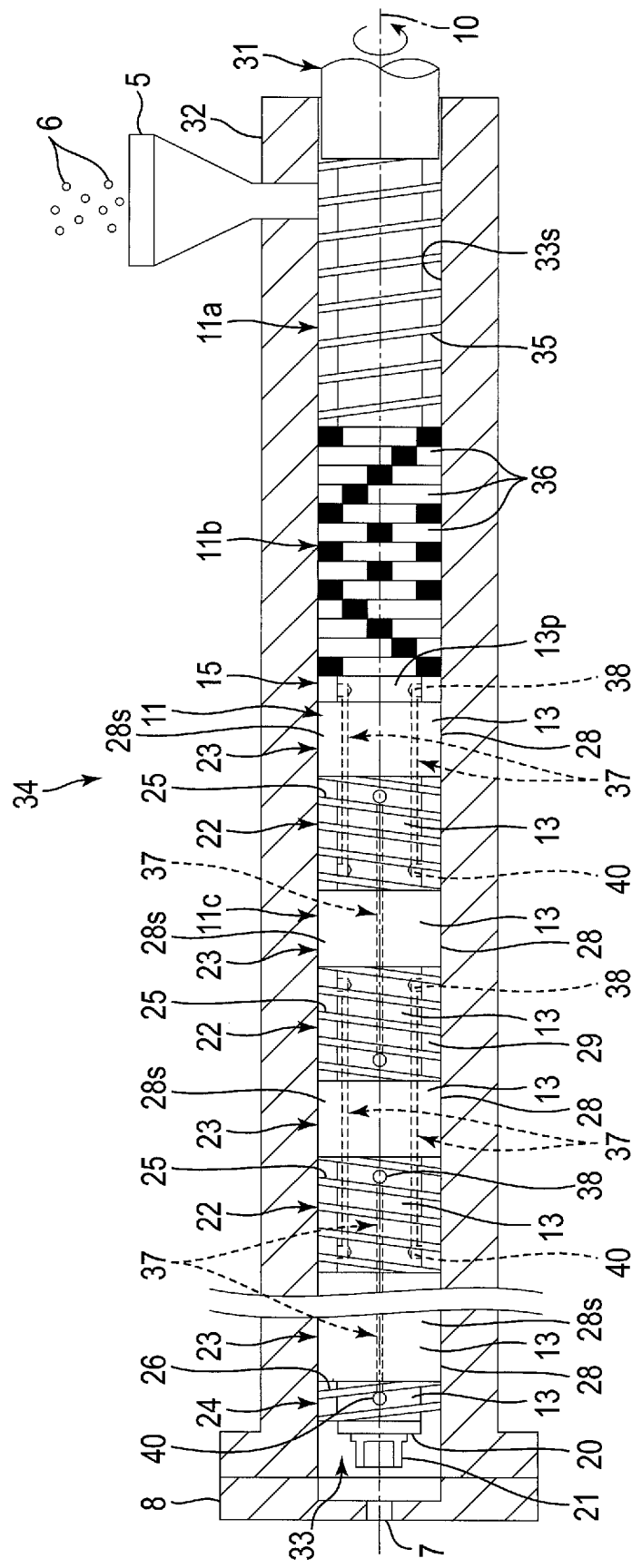
FIG. 19 is a transverse sectional view showing the external structure of the extruder screw in a whole structure of a twin screw extruder according to a modification of the present invention.

FIG. 19 shows an example of the twin screw extruder 34. The figure shows only one extruder screw 31 of the two extruder screws 31. The other extruder screw is not shown, as it is hidden behind the one extruder screw 31.

In the twin screw extruder 34, the two extruder screws 31 can rotate in the same direction in a state of engaging each other. As in the above-described one embodiment, the two extruder screws 31 are also provided with screw main bodies 11 rotating integrally with the screws 31. In a state in which the extruder screws 31 engage with each other, the transfer portion 11a, the melt-and-mix portion 11b, the kneading portion 11c are formed between the screw main bodies 11 in order from the basal ends toward the tips of the screw main bodies 11.

The transfer portion 11a continuously conveys the materials 6 supplied from the supply port 5 to the cylinder 33 toward the melt-and-mix portion 11b. On each of the screw main bodies 11 in the transfer portion 11a, a spiral flight 35 is continuously formed on their outer circumferential surfaces. The flight 35 is configured to continuously convey each of the materials 6 supplied from the supply port 5 to the cylinder 33 from the transfer portion 11a toward the melt-and-mix portion 11b. Thus, the flight 35 is twisted in the opposite direction to the rotation direction of the screw main bodies 11.

The melt-and-mix portion 11b continuously melts and mixes each of the materials 6 conveyed from the transfer portion 11a. Each of the screw main bodies 11 in the melt-and-mix portion 11b comprises disks 36 adjacent to each other in the axial direction. The disks 36 are disposed in a state in which the adjacent disks 36 are made differ in phase.

In the kneading portion 11c, on each of the screw main bodies 11, the conveyance portions 22 and the barrier portions 23 are alternately disposed in the axial direction as in the above-described one embodiment. In the barrel 4, an inner surface 33s of the cylinder 33 is formed to have a shape which can accommodate the two extruder screws 31 in a state of engaging with each other together, and rotate them simultaneously in the same direction. Description of the other structures is the same as that of the above-described one embodiment, and is thus omitted.

According to the above-described twin screw extruder 34, in a state in which the two extruder screws 31 are rotated in the same direction, for example, at a rotational rate of 100 to 300 rpm, the materials 6 supplied from the supply port 5 to the cylinder 33 are continuously conveyed from the transfer portion 11a to the melt-and-mix portion 11b. In the melt-and-mix portion 11b, each of the materials 6 is continuously melted and mixed. At this time, the melted and mixed materials 6 become raw materials for kneading, and are conveyed from the melt-and-mix portion 11b to the kneading portion 11c. Then, the conveyed raw materials are introduced to the kneading portion 11c through the above-described introduction portion 15, and then become kneaded materials of an increased degree of kneading and are continuously extruded from the discharge port 7.

Here, in the twin screw extruder 34, if conveyance action, by which raw materials are fed from the melt-and-mix portion 11b to the introduction portion 15, is insufficient, a raw-material feeding mechanism is preferably provided between the melt-and-mix portion 11b and the introduction portion 15. As the raw-material feeding mechanism, for example, it suffices that a tube 13 on which the same flight as the flight 35 provided in the transfer portion 11a is formed is prepared, and the tube 13 is inserted and disposed between the melt-and-mix portion 11b and the introduction portion 15. Just enough raw materials can be thereby fed from the melt-and-mix portion 11b to the introduction portion 15.

In the above-described embodiment, the technical idea (extrusion technique of improving the degree of kneading)

of the present invention has been applied to the case where the materials 6 are kneaded. However, the technical idea of the present invention is not limited to this, and is also applied to prevent the occurrence of a minute portion that is not melted or prevent the occurrence of a minute portion in which the temperature of resin is not uniform when melting one kind of material.

REFERENCE SIGNS LIST

2: Extruder screw
10: Axial line
11: Screw main body
11a: Transfer portion
11b: Melt-and-mix portion
11c: Kneading portion
12: Flight
13: Tube
13p: Introduction tube
14: Axis of rotation
15: Introduction portion
22: Conveyance portion
23: Barrier portion
24: Discharge conveyance portion
25, 26: Flight
27: Gap
28: Barrier annular body
29: Conveyance path
37: Path
38: Entrance
39: Path main body
40: Exit

What is claimed is:

1. A kneading method comprising:
kneading raw materials with an extruder screw comprising:
a transfer portion configured to continuously convey supplied materials,
a melt-and-mix portion configured to continuously melt and mix the conveyed materials, and
a kneading portion configured to continuously knead the raw materials obtained by melting and mixing the materials,
wherein the transfer portion, the melt-and-mix portion, and the kneading portion are provided in a screw main body configured to rotate on a straight axial line, and
a conveyance portion configured to convey the raw materials, a barrier portion configured to limit conveyance of the raw materials, and a path through which the raw materials flow are provided at places of a portion of the screw main body in which the kneading portion is provided,
wherein
the conveyance portions and the barrier portions are alternately arranged along the axial direction of the screw main body,
the paths each comprise an entrance opened in the outer circumferential surface of the screw main body to cause the raw material, the conveyance of which is limited by the barrier portions to increase pressure on the raw material, to flow in, an exit opened in the outer circumferential surface of the screw main body to allow the flowing raw material to flow out to the outer circumferential surface of the screw main body, and a path main body connecting between the entrance and the exit, and
inside at least one barrier portion and two conveyance portions adjacent to respective sides of the barrier portion,
the respective path is provided entirely through the barrier portion and extends into the two conveyance portions adjacent to the respective sides of the barrier portion,
the entrance is provided in a downstream end of one side of the two conveyance portions with respect to a conveyance direction of the conveyance portions,
the exit is provided in an upstream end of an other side of the conveyance portions with respect to a conveyance direction of the conveyance portions, and
the raw material flowing into the entrance flows towards the exit in an opposite direction to the conveyance directions of the conveyance portions; and
continuously producing and extruding the kneaded materials with the extruder screw, wherein in the kneading portion, the raw materials conveyed along the outer circumferential surface of the screw main body flow through the path and then return to the outer circumferential surface of the screw main body, while the kneaded materials are continuously extruded.

2. The kneading method of claim 1, wherein in the kneading portion,
the conveyance of the raw materials conveyed along the outer circumferential surface of the screw main body is limited by the barrier portion provided in the kneading portion to increase the pressure on the raw materials, and
the raw materials, the pressure on which is increased, flow into the path from the entrance.

3. The kneading method of claim 2, wherein in the kneading portion, the raw materials flowing into the path from the entrance flow through the path in the opposite direction to the conveyance direction of the conveyance portions.

4. The kneading method of claim 3, wherein in the kneading portion, the raw materials flowing through the path flow out of the exit to the outer circumferential surface of the screw main body at the position outside the conveyance portion in which the entrance is opened.

5. The kneading method of claim 1, wherein the portion of the screw main body in which the kneading portion is provided has an outside diameter which is a fixed value over a total length of the portion.

6. The kneading method of claim 1, wherein the screw main body extends in an axial direction from a basal end connected to a rotating device to a tip,
the conveyance portion is provided with a flight spirally twisted along the outer circumferential surface of the screw main body, and
from a perspective of a basal end side, the flight is twisted from the basal end toward the tip of the screw main body in a same direction as a rotation direction of the screw main body.

* * * * *